(12) United States Patent
Doman et al.

(10) Patent No.: US 8,468,576 B2
(45) Date of Patent: Jun. 18, 2013

(54) SYSTEM AND METHOD FOR APPLICATION-INTEGRATED INFORMATION CARD SELECTION

(75) Inventors: Thomas E. Doman, Pleasant Grove, UT (US); Duane F. Buss, West Mountain, UT (US); Daniel S. Sanders, Orem, UT (US); Andrew A. Hodgkinson, Pleasant Grove, UT (US); James G. Sermersheim, Woodland Hills, UT (US); James M. Norman, Pleasant Grove, UT (US)

(73) Assignee: Apple Inc., Cupertino, CA (US)

( * ) Notice: Subject to any disclaimer, the term of this patent is extended or adjusted under 35 U.S.C. 154(b) by 570 days.

(21) Appl. No.: 12/243,619

(22) Filed: Oct. 1, 2008

(65) Prior Publication Data

US 2009/0205014 A1 Aug. 13, 2009

Related U.S. Application Data

(63) Continuation-in-part of application No. 12/029,373, filed on Feb. 11, 2008.

(51) Int. Cl.
*H04L 29/06* (2006.01)

(52) U.S. Cl.
USPC ............... 726/1; 726/2; 726/3; 726/5; 726/6; 726/7; 726/9; 726/20; 235/380

(58) Field of Classification Search
USPC .................. 726/1–3, 5–7, 9, 20; 235/380
See application file for complete search history.

(56) References Cited

U.S. PATENT DOCUMENTS

| | | |
|---|---|---|
| 6,327,578 B1 | 12/2001 | Linehan |
| 7,103,575 B1 | 9/2006 | Linehan |
| 7,225,156 B2 | 5/2007 | Fisher et al. |
| 7,500,607 B2 | 3/2009 | Williams |
| RE40,753 E | 6/2009 | Wang et al. |
| 7,591,424 B2 | 9/2009 | Wang et al. |

(Continued)

FOREIGN PATENT DOCUMENTS

| | | |
|---|---|---|
| EP | 0917120 | 5/1999 |
| WO | WO2008/088945 | 7/2008 |

OTHER PUBLICATIONS

Vishal NagarKar, "How to Drag Drop in Javascript (Part I)", 2006, http://www.codeproject.com/KB/scripting/DragDrip_Part_1_.aspx.*

(Continued)

*Primary Examiner* — Brandon Hoffman
*Assistant Examiner* — Hee Song
(74) *Attorney, Agent, or Firm* — Blakely, Sokoloff, Taylor & Zafman LLP

(57) ABSTRACT

A selector daemon can run in the background of a computer. Applications that are capable of processing information cards directly, without requiring the use of a card selector, can request the selector daemon to list information cards that satisfy security policy. Upon receiving such a request, selector daemon can determine the information cards available on the computer that satisfy the security policy, and can identify these information cards to the requesting application. The applications can then use the identified information cards in any manner desired, without having to use a card selector: for example, by requesting a security token based on one of the information cards directly from an identity provider.

45 Claims, 18 Drawing Sheets

U.S. PATENT DOCUMENTS

| | | | |
|---|---|---|---|
| 7,788,493 B2* | 8/2010 | Mononen et al. | 713/170 |
| 7,831,522 B1* | 11/2010 | Satish et al. | 705/76 |
| 2003/0126094 A1 | 7/2003 | Fisher et al. | |
| 2003/0172090 A1 | 9/2003 | Asunmaa et al. | |
| 2004/0199475 A1 | 10/2004 | Rivest et al. | |
| 2005/0289341 A1* | 12/2005 | Ritola et al. | 713/168 |
| 2007/0043651 A1 | 2/2007 | Xiao et al. | |
| 2007/0192245 A1 | 8/2007 | Fisher et al. | |
| 2007/0204168 A1 | 8/2007 | Cameron et al. | |
| 2007/0204325 A1* | 8/2007 | Cameron et al. | 726/1 |
| 2007/0214429 A1* | 9/2007 | Lyudovyk et al. | 715/772 |
| 2008/0162297 A1 | 7/2008 | Hershkovitz et al. | |
| 2009/0138398 A1 | 5/2009 | Cole et al. | |

OTHER PUBLICATIONS

Computer Security Institute; "What InfoCard Is and Isn't"; http://web.archive.org/web/20060423133 805/http:/www.identityblog.com/wp-content/resources/alert.pdf, May 2006 (4 pages).

Cameron, Kim et al; "Design Rationale behind the Identity Metasystem Architecture"; http://www.identityblog.com/, http://research.microsoft.com/~mbj/; Mar. 16, 2006, pp. 1-11.

Hoang et al.; "Secure Roaming with Identity Metasystems"; ACM 978-1-60558-006-1; http://portal.acm.org/citation.cfm?id=1373297; 2008, pp. 36-47.

Jones, Michael B., "Michael B. Jones Homepage"; http://research.microsoft.com/en-us/um-people/mbj; Aug. 12, 2009, pp. 1-4.

Jones, Michael B., "Mike Jones: self-issued"; http://research.microsoft.com/en-us/um-people/mbj; Aug. 12, 2009, pp. 1-45.

Sol, S., "The Display (GUI) Layer" Intro to the Web Application Development Environment, http://web.archive.org/web/20001119171800/http://extropia.com/tutorials/devenv/gui.html>, Nov. 19, 2000, pp. 1-10, XP002517142.

Cambridge, "Cambridge Dictionary Online", Internet Article, http://dictionary.cambridge.org/define.asp?key=11419&dict=CALD>, Feb. 26, 2009, XP002517143.

Harjanto, A., "InfoCard and Browser Integration", Internet Article, http://blogs.msdn.com/andyhar/archive/2006/02/20/535333.aspx>, Feb. 20, 2006, XP002517147.

Dingle, P., "Identity Selectors & Browser Detection", Internet Article, http://eternallyoptimistic.com/2006/11/05/identity-selectors-browser-detection/>, Nov. 5, 2006, XP002517148.

Techtree News Staff, "Infocard Spells End of Passwords", Internet Article, http://www.techtree.com/techtree/jsp/article.jsp?print=1&article_id=71396&cat_id=582>, Feb. 16, 2006, XP002517144.

Tewfiq El Maliki et al.; A Survey of User-centric Identity Management Technologies; Emerging Security Information Systems, and Technologies, 2007, pp. 12-17.

Sanders, T., "IBM/Novell unveil rival to Microsoft Infocard", Internet Article, http://www.vnunet.com/articles/print/2151060>, Feb. 26, 2006, XP002517145.

Cameron, K., "Bill Gates, Inforcards and the Identity Metasystem", Internet Article, http://www.identityblog.com/?p=374>, Feb. 19, 2006, XP002517146.

Darknet (2007), "Don't Learn to Hack—Hack to Learn". Retrieved from http://www.darknet.org.uk/2007/03/pwdhash-from-stanford-generate-passwords-by-hashing-the-url, pp. 1-7.

Allan, A. (2003), "Best Practices for Managing Passwords: Self-Service Q&A". Published by Garner, Inc. at Tutorials, TU-20/2040, pp. 1-5.

Microsoft Corporation, Ping Identity Corporation (Aug. 2005), "A Guide to Integrating with InfoCard v1.0", XP007908505, pp. 1-62.

The Resource STS: R-STS, RP-STS, A-STS. . . the other face of token issuing, Vibro.NET, http://209.85.175.104/search?q=cache:mFlf-sZFBLsJ:blogs.msdn.com/vbertocci/archive/2007/09/24/the-resource-sts-r-sts-rp-sts-a-sts-the-other-face-of-token-issuing.aspx+microsoft+age+STS+RP&hl=en&ct=clnk&cd=2&gl=us&client=firefox-a, MSDN Blogs, 2007.

"Identity Selector Interoperability Profile specification and companion guides", Microsoft Download Center, http://www.microsoft.com/downloads/details.aspx?DisplayLang=en&FamilyID=b94817fc-3991-4dd0-8e85-b73e626f6764, Microsoft Corporation, 2007.

Nanda, Arun, "Identity Selector Interoperability Profile V1.0", Microsoft Download Center, http://download.microsoft.com/download/1/1/a/11ac6505-e4c0-4e05-987c-6f1d31855cd2/Identity-Selector-Interop-Profile-v1.pdf, Microsoft Corporation, Apr. 2007.

Microsoft Corporation, Ping Identity Corporation, An Implementer's Guide to the Identity Selector Interoperability Profile V1.0, Microsoft Download Center, http://download.microsoft.com/download/1/1/a/11ac6505-e4c0-4e05-987c-6f1d31855cd2/Identity-Selector-Interop-Profile-v1-Guide.pdf, Microsoft Corporation, Apr. 2007.

Jones, Michael B., "A Guide to Using the Indentity Selector interoperability Profile V1.0 within Web Applications and Browsers", Microsoft Download Center, http://download.microsoft.com/download/1/1/a/11ac6505-e4c0-4e05-987c-6f1d31855cd2/Identity-Selector-Interop-Profile-v1-Web-Guide.pdf, Microsoft Corporation, Apr. 2007.

The Eclipse Foundation, "Higgins FAQ", http://www.eclipse.org/higgins/faq.php, 2007, pp. 1-2.

"Components—Eclipsepedia", http:/wiki.eclipse.org/Components, 2007, pp. 1-8.

"Architecture-Eclipsepedia", http:/wiki.eclipse.org/index.php/Architecture, 2007, pp. 1-2.

U.S. Appl. No. 11/395,725, filed Mar. 31, 2006 entitled "Methods and Systems for Multifactor Authentication." This is a commonly owned application that is in the same general field as the invention.

Chappell, David, "Introducing Windows CardSpace," Windows Vista Technical Articles, http://msdn2.microsoft.com/en-us/library/aa480189.aspx, Microsoft Corporation, 2008.

Just, Mike, "Designing Authentication Systems with Challenge Questions," Security and Usability, Ed. Lorrie Faith Cranor and Simson Garfinkel, Chapter 8, pp. 147-160, O'Reilly Media, Inc., Sebastopol, CA, Aug. 5, 2005.

Pwdhash From Stanford, Generate Passwords by Hashing the URL, "Don't Learn to Hack—Hack to Learn," http://www.darknet.org.uk/2007/03/pwdhash-from-stanford-generate, Darknet, Mar. 13, 2007.

"Microsoft's Vision for an Identity Metasystem," http://www.identityblog.com/stories/2005/07/05/IdentityMetasystem.htm, Microsoft Corporation, May 2005.

Gnucitizen, "Attacking Password Recovery Facilities," http://www/gnucitizen.org/blog/attacking-password-recovery-facilities, Jul. 6, 2007.

* cited by examiner

| List of Associations | |
|---|---|
| Application 1 | Security Policy 1 |
| Application 2 | Security Policy 2 |
| Application 3 | Security Policy 3 |
| ⋮ | ⋮ |

SYSTEM AND METHOD FOR APPLICATION-INTEGRATED INFORMATION CARD SELECTION

RELATED APPLICATION DATA

This application is a continuation-in-part of co-pending U.S. patent application Ser. No. 12/029,373, titled "VISUAL AND NON-VISUAL CUES FOR CONVEYING STATE OF INFORMATION CARDS, ELECTRONIC WALLETS, AND KEYRINGS", filed Feb. 11, 2008, which is herein incorporated by reference for all purposes.

This application is related to co-pending U.S. patent application Ser. No. 11/843,572, titled "PERFORMING A BUSINESS TRANSACTION WITHOUT DISCLOSING SENSITIVE IDENTITY INFORMATION TO A RELYING PARTY", filed Aug. 22, 2007, co-pending U.S. patent application Ser. No. 11/843,638, titled "POLICY-BASED AUDITING OF IDENTITY CREDENTIAL DISCLOSURE BY A SECURE TOKEN SERVICE", filed Aug. 22, 2007, and co-pending U.S. patent application Ser. No. 11/843,640, titled "FRAMEWORK AND TECHNOLOGY TO ENABLE THE PORTABILITY OF INFORMATION CARDS", filed Aug. 22, 2007, all of which are herein incorporated by reference for all purposes and all of which claim the benefit of U.S. Provisional Patent Application Ser. No. 60/895,312, filed Mar. 16, 2007, U.S. Provisional Patent Application Ser. No. 60/895,316, filed Mar. 16, 2007, and U.S. Provisional Patent Application Ser. No. 60/895,325, filed Mar. 16, 2007, all of which are herein incorporated by reference for all purposes.

This application is also related to co-pending U.S. patent application Ser. No. 12/019,104, titled "PROCESSING HTML EXTENSIONS TO ENABLE SUPPORT OF INFORMATION CARDS BY A RELYING PARTY", filed Jan. 24, 2008, which claims the benefit of U.S. Provisional Patent Application Ser. No. 60/973,679, filed Sep. 19, 2007, both of which are herein incorporated by reference for all purposes.

This application is also related to co-pending U.S. patent application Ser. No. 11/843,591, titled "CREDENTIAL CATEGORIZATION", filed Aug. 22, 2007, co-pending U.S. patent application Ser. No. 11/843,608, titled "CHAINING INFORMATION CARD SELECTORS", filed Aug. 22, 2007, co-pending U.S. patent application Ser. No. 12/026,775, titled "METHODS FOR SETTING AND CHANGING THE USER CREDENTIAL IN INFORMATION CARDS", filed Feb. 6, 2008, co-pending U.S. patent application Ser. No. 12/030,363, titled "INFO CARD SELECTOR RECEPTION OF IDENTITY PROVIDER BASED DATA PERTAINING TO INFO CARDS", filed Feb. 12, 2008, co-pending U.S. patent application Ser. No. 12/038,674, titled "SYSTEM AND METHOD FOR SECURE ACCOUNT RESET UTILIZING INFORMATION CARDS", filed Feb. 27, 2008, co-pending U.S. patent application Ser. No. 12/042,205, titled "PRIVATELY SHARING RELYING PARTY REPUTATION WITH INFORMATION CARD SELECTORS", filed Mar. 4, 2008, co-pending U.S. patent application Ser. No. 12/044,816, titled "SYSTEM AND METHOD FOR USING WORKFLOWS WITH INFORMATION CARDS", filed Mar. 7, 2008, co-pending U.S. patent application Ser. No. 12/054,137, titled "CARDSPACE HISTORY VALIDATOR", filed Mar. 24 2009, co-pending U.S. patent application Ser. No. 12/054,774, titled "CLAIM CATEGORY HANDLING", filed Mar. 25, 2008, co-pending U.S. patent application Ser. No. 12/108,805, titled "RESTRICTED USE INFORMATION CARDS", filed Apr. 24, 2008, co-pending U.S. patent application Ser. No. 12/111,874, titled "REMOTABLE INFORMATION CARDS", filed Apr. 29, 2008, co-pending U.S. patent application Ser. No. 12/112,772, titled "DYNAMIC INFORMATION CARD RENDERING", filed Apr. 30, 2008, co-pending U.S. patent application Ser. No. 12/170,384, titled "NON-INTERACTIVE INFORMATION CARD TOKEN GENERATION", filed Jul. 9, 2008, and co-pending U.S. patent application Ser. No. 12/184,155, titled "SITE-SPECIFIC CREDENTIAL GENERATION USING INFORMATION CARDS", filed Jul. 31, 2008, all of which are herein incorporated by reference for all purposes.

FIELD OF THE INVENTION

This invention pertains to using information cards, and more particularly to permitting a user to utilize information cards stored on a computer system without having to interface with the card selector.

BACKGROUND OF THE INVENTION

When a user interacts with sites on the Internet (hereafter referred to as "service providers" or "relying parties"), the service provider often expects to know something about the user that is requesting the services of the provider. The typical approach for a service provider is to require the user to log into or authenticate to the service provider's computer system. But this approach, while satisfactory for the service provider, is less than ideal to the user. First, the user must remember a username and password for each service provider who expects such information. Given that different computer systems impose different requirements, and the possibility that another user might have chosen the same username, the user might be unable to use the same username/password combination on each such computer system. (There is also the related problem that if the user uses the same username/password combination on multiple computer systems, someone who hacks one such computer system would be able to access other such computer systems.) Second, the user has no control over how the service provider uses the information it stores. If the service provider uses the stored information in a way the user does not want, the user has relatively little ability to prevent such abuse, or recourse after the fact.

To address this problem, new systems have been developed that allow the user a measure of control over the information stored about the user. Windows CardSpace™ (sometimes called CardSpace) is a Microsoft implementation of an identity meta-system that offers a solution to this problem. (Microsoft, Windows, and CardSpace are either registered trademarks or trademarks of Microsoft Corporation in the United States and/or other countries.) A user can store identity information with an identity provider the user trusts. When a service provider wants some information about the user, the user can control the release of information stored with the identity provider to the service provider. The user can then use the offered services that required the identity information.

While this system simplifies the management of information used to satisfy the requests of service providers, there are potential problems. For example, when a user visits a relying party on a website that requests a security token to proceed, the user is prompted to select an information card by the card selector. From the user's perspective, the card selector may seem to appear on the user's computer screen unexpectedly and without warning. If the user is not experienced with how the information card system operates, the user might think the card selector appeared on the screen by mistake, and might close the card selector instead of selecting an information card. Further, if the user is running a standalone (nonbrowser) application such as an e-mail management application, the appearance of a foreign card selector which appears very different from the standalone application being run can result in an equally, if not more, awkward user experience. This could lead to the browser indicating that the relying party refused to let the user continue. Again, if the user is inexperienced, the user might attribute his or her failure to access the resource of the relying party on the relying party, rather than on the user's inexperience with the information card system.

A need remains for a way to addresses these and other problems associated with the prior art.

SUMMARY OF THE INVENTION

In an embodiment of the invention, a computer includes a memory, an application, and a selector daemon. The selector daemon can receive a security policy from the application, and can identify information cards that satisfy the security policy, which can be used with the application as desired.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
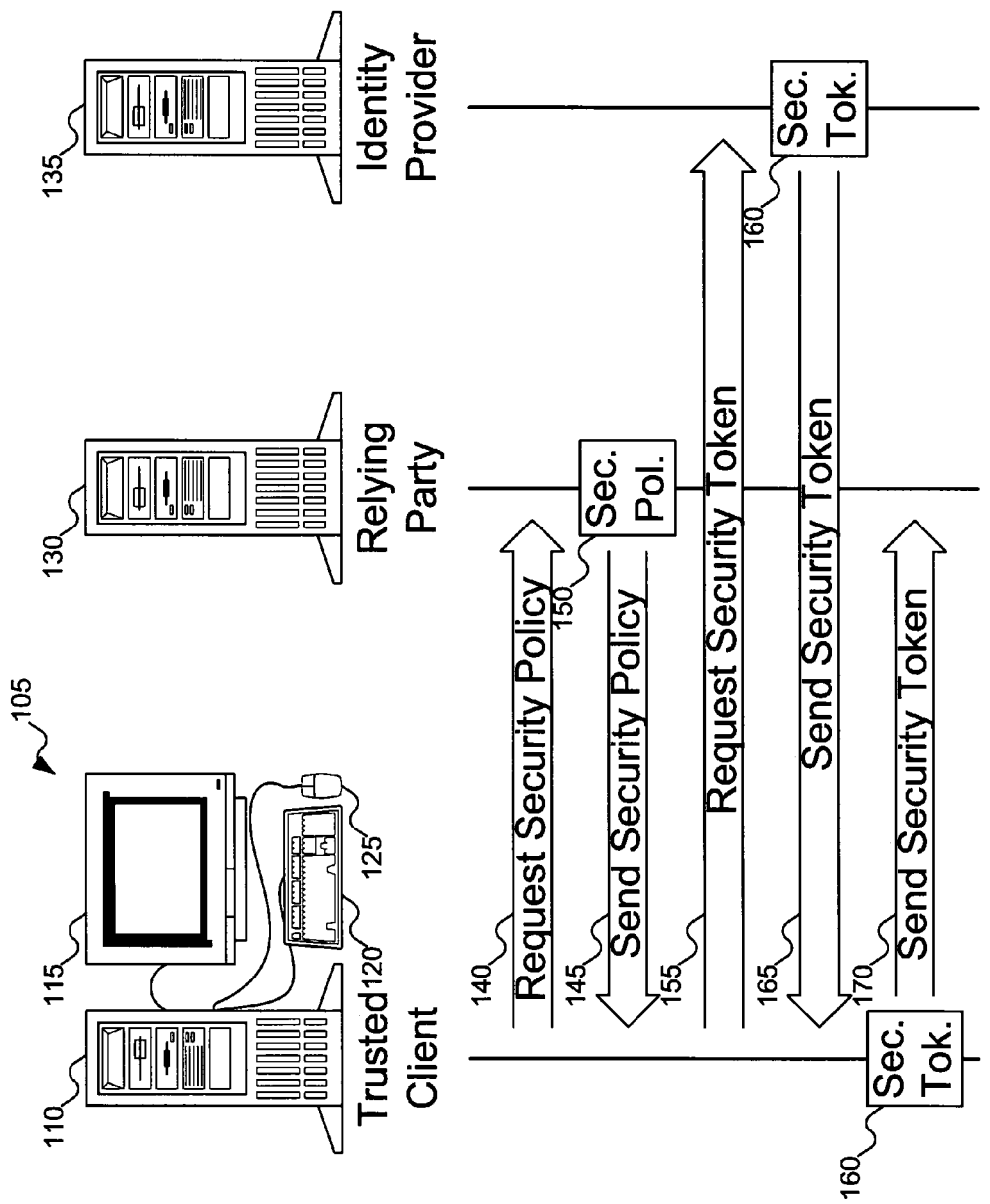
FIG. 1 shows a sequence of communications between a client, a relying party, and an identity provider.

Before explaining the invention, it is important to understand the context of the invention. FIG. 1 shows a sequence of communications between a client, a relying party, and an identity provider. For simplicity, each party (the client, the relying party, and the identity provider) can be referred to by their machines. Actions attributed to each party are taken by that party's machine, except where the context indicates the actions are taken by the actual party.

In FIG. 1, computer system 105, the client, is shown as including computer 110, monitor 115, keyboard 120, and mouse 125. A person skilled in the art will recognize that other components can be included with computer system 105: for example, other input/output devices, such as a printer. In addition, FIG. 1 does not show some of the conventional internal components of computer system 105: for example, a central processing unit, memory, storage, etc. Although not shown in FIG. 1, a person skilled in the art will recognize that computer system 105 can interact with other computer systems, such as relying party 130 and identity provider 135, either directly or over a network (not shown in FIG. 1) of any type. Finally, although FIG. 1 shows computer system 105 as a conventional desktop computer, a person skilled in the art will recognize that computer system 105 can be any type of machine or computing device capable of providing the services attributed herein to computer system 105, including, for example, a laptop computer, a personal digital assistant (PDA), or a cellular telephone.

Relying party 130 is a machine managed by a party that relies in some way on the identity of the user of computer system 105. The operator of relying party 130 can be any type of relying party. For example, the operator of relying party 130 can be a merchant running a business on a website. Or, the operator of relying party 130 can be an entity that offers assistance on some matter to registered parties. Relying party 130 is so named because it relies on establishing some identifying information about the user.

Identity provider 135, on the other hand, is managed by a party responsible for providing identity information (or other such information) about the user for consumption by the relying party. Depending on the type of information identity provider 135 stores for a user, a single user might store identifying information with a number of different identity providers 135, any of which might be able to satisfy the request of the relying party. For example, identity provider 135 might be a governmental agency, responsible for storing information generated by the government, such as a driver's license number or a social security number. Or, identity provider 135 might be a third party that is in the business of managing identity information on behalf of users.

The conventional methodology of releasing identity information can be found in a number of sources. One such source is Microsoft Corporation, which has published a document entitled Introducing Windows CardSpace, which is hereby incorporated by reference. To summarize the operation of Windows CardSpace, when a user wants to access some data from relying party 130, computer system 105 requests the security policy of relying party 130, as shown in communication 140, which is returned in communication 145 as security policy 150. Security policy 150 is a summary of the information relying party 130 needs, how the information should be formatted, and so on.

Once computer system 105 has security policy 150, computer system 105 can identify which information cards will satisfy security policy 150. (In this description, it will be understood that the information does not directly "satisfy" the security policy, but rather that the information card can be used to generate a security token, which includes the information requested as part of the security policy. Phrases such as "the information card satisfies the security policy" are a shorthand way of saying that a security token generated using the information card will include the information requested in the security policy.) Different security policies might result in different information cards being usable. For example, if relying party 130 simply needs a user's e-mail address, the information cards that will satisfy this security policy will be different from the information cards that satisfy a security policy requesting the user's full name, mailing address, and social security number. The user can then select an information card that satisfies security policy 150.

Once the user has selected an acceptable information card, computer system 105 uses the selected information card to transmit a request for a security token from identity provider 135, as shown in communication 155. This request can identify the data to be included in the security token, the credential that identifies the user, and other data the identity provider needs to generate the security token. Identity provider 135 returns security token 160, as shown in communication 165. Security token 160 includes a number of claims, or pieces of information, that include the data the user wants to release to the relying party. Security token 160 is usually encrypted in some manner, and perhaps signed and/or time-stamped by identity provider 135, so that relying party 130 can be certain that the security token originated with identity provider 135 (as opposed to being spoofed by someone intent on defrauding relying party 130). Computer system 105 then forwards security token 160 to relying party 130, as shown in communication 170.

In addition, the selected information card can be a self-issued information card: that is, an information card issued not by an identity provider, but by computer system 105 itself. In that case, identity provider 135 effectively becomes part of computer system 105, and computer system 105 generates security token 160.

In this model, a person skilled in the art will recognize that because all information flows through computer system 105, the user has a measure of control over the release of the user's identity information. Relying party 130 only receives the information the user wants relying party 130 to have, and does not store that information on behalf of the user (although it would be possible for relying party 130 to store the information in security token 160: there is no effective way to prevent such an act).

The problem with this model is, as noted above, that the card selector can appear unexpectedly on monitor 115: for example, if the user is interacting with relying party 130 using a browser. The unexpected appearance of the card selector can confuse a user, complicating the experience of using the information card. Even for users that are familiar with card selectors, the experience of having a card selector pop up all the time may be a less than desirable user interface (U/I) experience. It is desirable to provide U/I experiences that are more "in the flow" and preserve the look and feel and U/I style of the application the user is running.

The problem described above—the card selector appearing unexpectedly and interfering with the user's experience of an application—is but an example of a more general problem: trying to make the user's information cards (a form of an electronic wallet) available at all times, so that the user can select an information card and potentially use it with any application. The user experience can be enhanced further if the user can select an information card up front, which can be used with any information card-enabled application (either Web-based or standalone). If the user could select an information card in advance, the card selector would not need to interfere with the user experience: a security token could be generated automatically, without the card selector prompting the user to select an information card.

Figure 2:
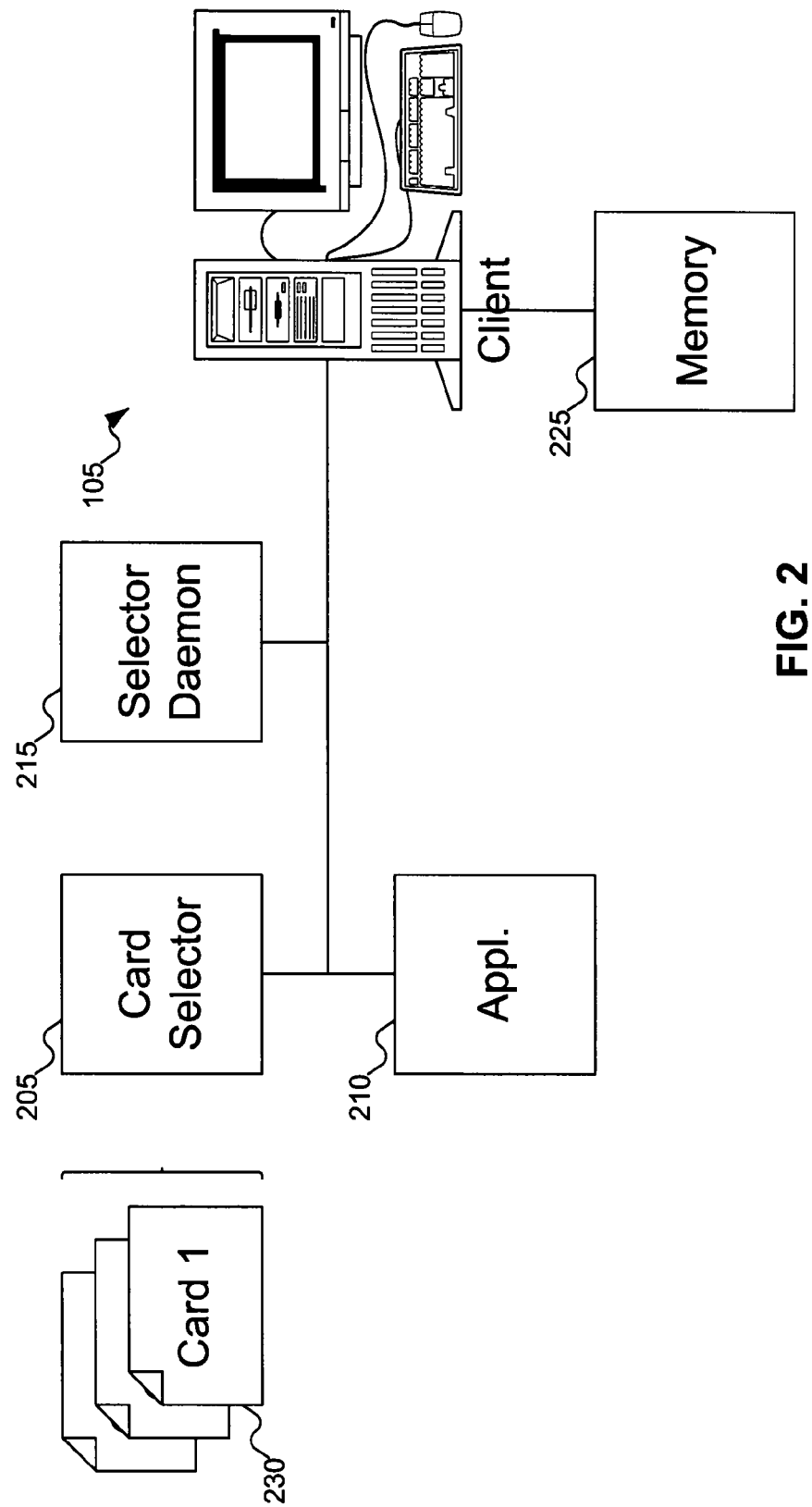
FIG. 2 shows the client of FIG. 1 equipped to permit the use of information cards without invoking the card selector, according to an embodiment of the invention.

Now that the problem—how to simplify the user's experience when using information cards—is understood, embodiments of the invention can be explained. FIG. 2 shows the client of FIG. 1 equipped to permit the use of information cards without invoking the card selector, according to an embodiment of the invention. In FIG. 2, client 105 includes card selector 205, application 210, and selector daemon 215. Card selector 205 enables the user of the client to select a desired information card, such as information card 220, to use in a particular transaction in the prior art embodiments, and also enables management of information cards. And as discussed above, information card 220 can be a personal information card, where all the information is provided by the user and is locally asserted to be valid, or a managed information card, where the information is stored on an identity provider and is asserted to be valid by the identity provider. But card selector 205 can complicate the use of the information card system when application 210 needs a security token generated based on an information card.

Application 210 can be any application that can need a security token generated based on an information card. For example, application 210 can be a browser, enabling a user to visit a web site offered by a relying party. Or, application 210 can be a plug-in operating within a browser, providing the user with some functionality that enhances the browsing experience, such as offering the user access to information in a database. Or, application 210 can be a standalone application running on client 205: for example, an e-mail management program that requires the user to authenticate himself or herself before the user is granted access to his or her e-mail account. A person skilled in the art will recognize other possible forms application 210 can take.

Application 210 normally resides in memory 225 of client 205. Memory 225 represents the storage on client 205 handling information currently being used, as opposed to a long-term storage (such as a hard drive) where an application not currently in use might be stored.

Selector daemon 215, also normally residing in memory 225, offers application 210 the ability to interact with information cards without needing to invoke card selector 205. As discussed below with reference to FIGS. 3-18, selector daemon 215 can identify information cards that satisfy a particular security policy, and can identify the information cards to application 210. This enables application 210 to present information cards to the user using the look-and-feel and style that is consistent with the U/I experience of application 210. It also enables application 210 to request a security token from an identity provider directly, without needing card selector 205 to provide that functionality (and return the security token to application 205). Selector daemon 215 can run in the background of client 105, and can be represented as an icon on the taskbar of client 105.

Figure 3:
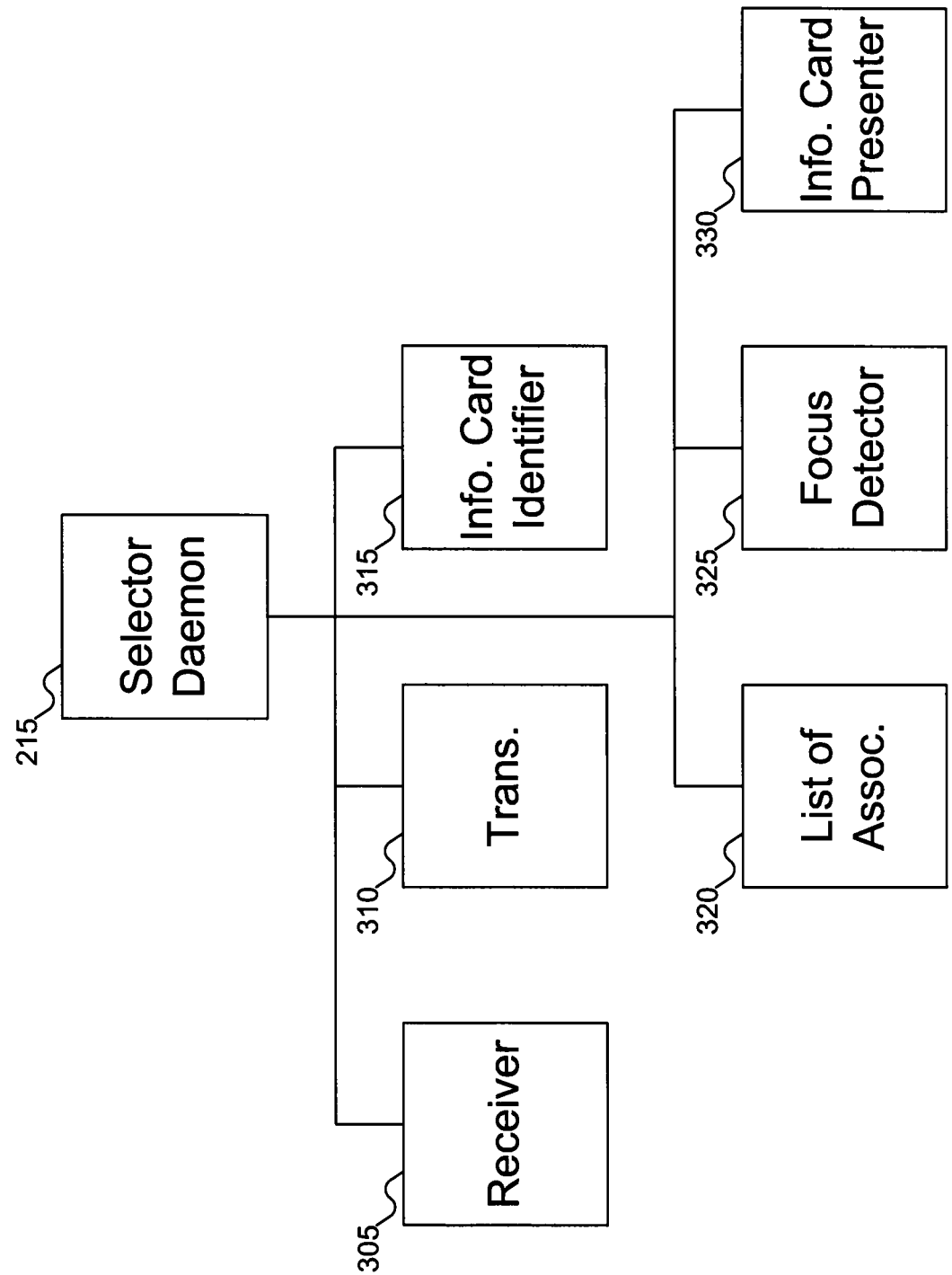
FIG. 3 shows more detail about the selector daemon of FIG. 2.

FIG. 3 shows more detail about the selector daemon 215 of FIG. 2. In FIG. 3, selector daemon 215 includes receiver 305, transmitter 310, information card identifier 315, list of associations 320, focus detector 325, and information card presenter 330. Receiver 305 and transmitter 310 enable selector daemon 215 to communicate with other software, such as application 210 (of FIG. 2). Information card identifier 315 identifies information cards that satisfy a given security policy. List of associations 320 stores a list of applications and the security policies associated with those applications; list of associations 320 is discussed further with reference to FIG. 8 below.

Focus detector 325 detects when an application has the focus on the computer. When an application has the focus, selector daemon 215 can access the associated security policy using list of associations 320. And once the associated security policy is identified, selector daemon 215 can use information card identifier 315 to identify information cards that satisfy the security policy associated with the application which currently has the focus. As will be discussed below with reference to FIGS. 5-7, selector daemon 215 does not need to use focus detector 325, as selector daemon 215 can receive the security policy in a message from an application, via receiver 305.

Finally, information card presenter 330 can present the information cards identified as satisfying the security policy to a party that can use that information. In one embodiment, the application can transmit a message (as discussed below with reference to FIGS. 5-7), requesting selector daemon 215 to identify all information cards available on the computer that satisfy a given security policy. Information card presenter 330 can then present the identified information cards to the application. The application can then use the identified information cards in any desired manner. For example, the application can present the information cards to the user in a format that is consistent with the operation of the application (effectively causing the application to act as a substitute card selector). Upon receiving from the user a selection of one of the identified information cards, the application can then request a security token from the identity provider that manages the selected information card (or, if the selected information card is a personal information card, the application can request the security token be generated by the selector daemon or generate the security token internally). If the selected information card requires the user to provide some form of authentication before the security token can be generated, the application can request this authentication from the user and provide this authentication to the identity provider.

In another embodiment, the application can request the security token from the card selector. But in issuing this request, the application can identify the information card to be used, rather than providing the security policy. (The request of the card selector to provide the security token can also include the security policy, to limit the information included in the security token.) In this manner, the user interface of the card selector (prompting the user to select an information card to use) can be skipped, simplifying the experience for the user.

In yet another embodiment, the application can request the security token from the card selector or the selector daemon, without specifying an individual information card. But in issuing this request, the application can provide a sufficiently specific security policy, so that the selector can identify a single information card to be used. Similar to above description, the user interface of the card selector can be skipped. In this case, the application does not need to have specific knowledge of the information card(s) available on the client.

A person skilled in the art will recognize that one variation of this embodiment involves an application that does not itself use the security token directly, but rather provides the security token to another application. In such a variation, the application is essentially acting as an alternative card selector, perhaps providing an interface that is easier for the user to follow than that provided by the standard card selector.

In another embodiment, selector daemon 215 can track which application has the focus, using focus detector 325. Then, assuming that there is a security policy associated with the application that has focus, information card presenter 330 can present to the user a list of information cards that satisfy the security policy associated with the application that currently has the focus. As the application with the focus changes, selector daemon 215 can update the information cards that satisfy the security policy; these updates can then be presented to the user via information card presenter 330.

Once the user knows which information cards can satisfy the security policy of the application, the user can select an information card for use with the application. For example, the user can drag-and-drop an information card from those presented by information card presenter 330 to the application. This causes selector daemon 215 to transmit to the application an identifier for the selected information card. The application can then use the selected information card as desired: for example, by transmitting to selector daemon 215 a request for a security token based on the selected information card. Selector daemon 215 can then transmit the request for the security token to an identity provider. Alternatively, the application can transmit the request for the security token based on the selected information card from the card selector, or directly to the identity provider.

The above discussion describes information card presenter 330 identifying the available information cards to the application. But information card presenter 330 can also present such information to the user. When information card presenter 330 is presenting information cards to the user, information card presenter 330 can distinguish between information cards that satisfy the security policy and those that do not in any desired manner. In one embodiment, information card presenter 330 only presents to the user information cards that satisfy the security policy; information cards that do not satisfy the security policy are not presented to the user at all. For example, if information card presenter 330 maintains a window showing the available information cards, this window can include only those information cards that satisfy the security policy, and omit those information cards that do not satisfy the security policy. In another embodiment, information card presenter 330 can present to the user all available information cards, but distinguish between those that satisfy the security policy and those that do not: for example, by graying out the information cards that do not satisfy the security policy, or by bolding those information cards that satisfy the security policy. By distinguishing between information cards that satisfy the security policy and those that do not, the user can easily select an information card that can be used to generate a security token that will satisfy the security policy.

While all of the above description suggests that information card presenter 330 is responsible for the window showing the user the available information cards, such is not required. Information card presenter 330 can modify an existing view of the information cards generated or maintained by some other process on the client. For example, if the operating system shows the user the information cards installed on the client, information card presenter 330 can modify this presentation to identify which information cards satisfy the security policy of the application currently in focus. In such an embodiment, information card presenter 330 (and therefore selector daemon 215) can inform the user as to which information cards can be used with a particular application, without information card presenter 330 (and therefore selector daemon 215) needing to provide a user interface to the user. Thus, information card presenter 330 can present information to the application or to the user without establishing a new view. In this manner, selector daemon 215 can operate without providing any direct interface for the user.

Figure 4:
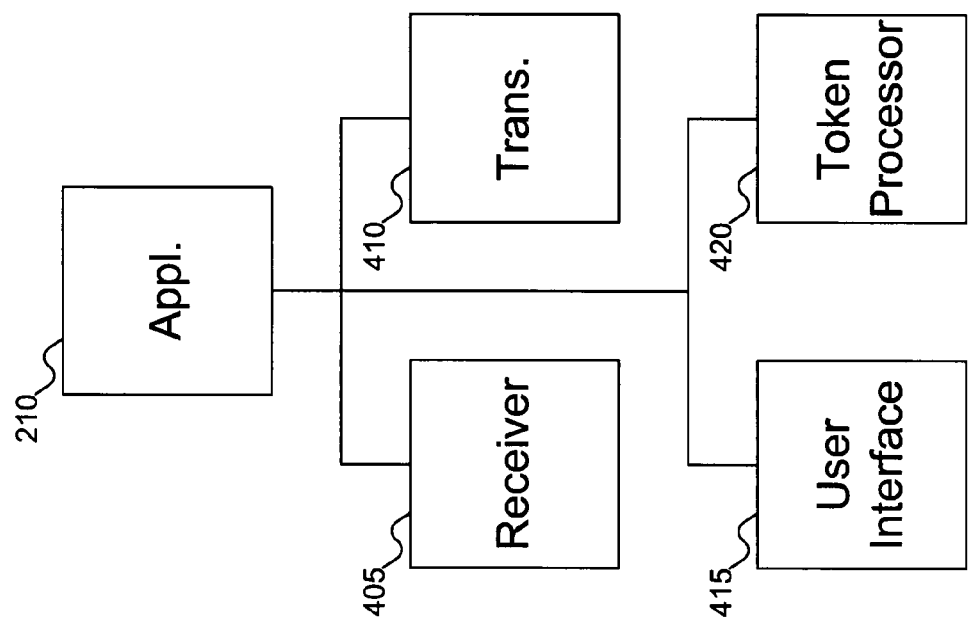
FIG. 4 shows more detail about the application of FIG. 2.

FIG. 4 shows more detail about the application of FIG. 2. In FIG. 4, application 210 includes receiver 405, transmitter 410, user interface 415, and token processor 420. Receiver 405 and transmitter 410 enable application 210 to communicate with other software, such as other programs running on the computer, as well as other devices to which the computer is connected. For example, if application 210 is a browser application used to access the Internet, receiver 405 and transmitter 410 can also be used by the browser application to communicate with the Internet.

User interface 415 enables a user to interact with application 210. More particularly, user interface 415 enables the user to interact with information cards from within application 210. In one embodiment, as discussed above, application 210 can request from a selector daemon a list of information cards satisfying a security policy. Assuming application 210 receives such a list of information cards, user interface 415 can present to the user the information cards received from the selector daemon that satisfy the security policy, and can permit the user to select a particular information card to use with application 210.

In one variation, application 210 can be an alternative card selector. That is, instead of the user interfacing with card selector 205 of FIG. 2, application 210 and user interface 415 can provide a user with an alternative means for interfacing with information cards. In this variation, application 210 might be nothing more than an alternative card selector: that is, application 210 might have no additional functionality beyond that of acting as an alternative card selector.

As discussed above, in one embodiment of the invention, application 210 can be a browser application, providing the user with access to the Internet. When a user is accessing the resources of the relying party via application 210, the security policy can be provided by the relying party. In other words, the security policy is not specific to the browser application, but rather dependent upon the relying party being visited by the user using the browser application. In another embodiment of the invention, application 210 can have a security policy that is specifically associated with application 210. The security policy can be stored locally with application 210, or can be stored elsewhere, as desired. When application 210 provides the security policy to the selector daemon, application 210 accesses the security policy from its location, and forwards it to the selector daemon.

While the above discussion suggests that a particular application might have only one security policy associated with it, a person skilled in the art will recognize that some applications might have multiple associated security policies. For example, a browser application used to visit the websites of multiple relying parties can access the security policies of each of the relying party; the security policy for one relying party does not have to be the same as the security policy for another relying party. Thus, the security policy provided by the browser application to the selector daemon does not have to be the same across multiple uses of the browser application, or even within a single use of the browser application. A person skilled in the art will also recognize that a browser application can have its own local security policy, independent of the security policies of relying parties. Again, the browser application can use context to determine which security policy should control at any particular time.

Similarly, a standalone application running on the computer might have multiple different security policies associated with it. The standalone application determines from context which security policy applies at a particular time, and provides that security policy to the selector daemon at the appropriate time.

Once a single information card that satisfies the security policy has been selected by the user, application 210 can then request a security token to be generated based on the identified information card. Application 210 can request the security token directly from the appropriate identity provider, without going through the card selector. Application 210 sends (via transmitter 410) a request for a security token to the identity provider. Application 210 can also include the security policy in the request of the security token. The identity provider can then use all of this information to generate the appropriate security token, which is returned to application 210. Once application 210 has the security token, token processor 420 can use the security token in an appropriate manner. For example, if application 210 needed the security token to authenticate the user to application 210, token processor 420 can parse a security token to complete the authentication of the user. On the other hand, if application 210 is a browser application and the user has visited a relying party's website, token processor 420 can forward the security token (via transmitter 410) to the relying party, permitting the relying party to authenticate the user and grant the user access to the requested resource.

Figure 5:
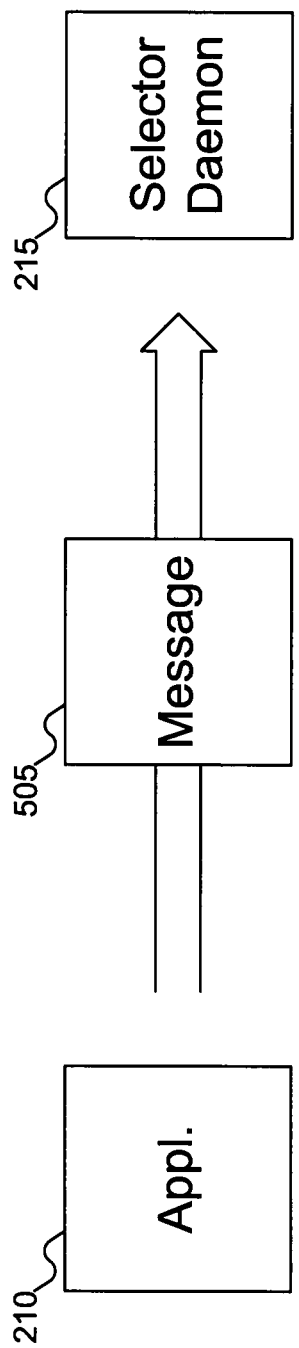
FIG. 5 shows the application of FIG. 2 sending a message to the selector daemon of FIG. 2.

FIG. 5 shows the application of FIG. 2 sending a message to the selector daemon of FIG. 2. In FIG. 5, application 210 is shown as sending message 505 to selector daemon 215. Message 505 can be any message application 210 can transmit and selector daemon 215 can receive. Not shown in FIG. 5 is a message being sent from selector daemon 215 to application 210; a person skilled in the art will recognize that communications can be sent in both directions.

Figure 7:
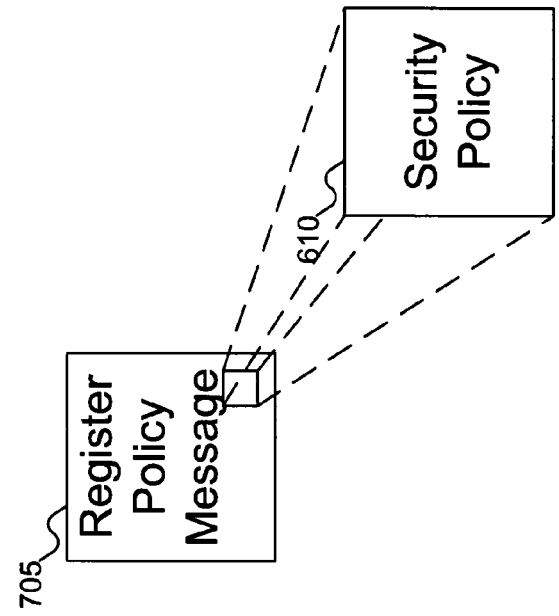
FIGS. 6 and 7 show different possible messages that the application of FIG. 2 can send to the selector daemon of FIG. 2.
Figure 6:
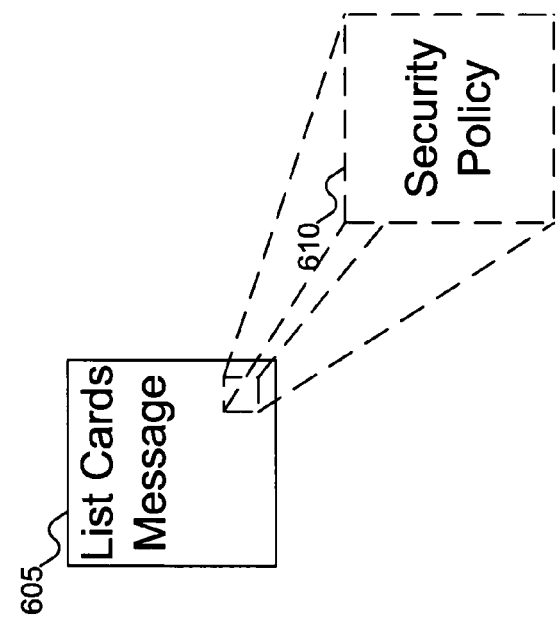

FIGS. 6 and 7 show different possible messages that the application of FIG. 2 can send to the selector daemon of FIG. 2. In FIG. 6, message 605 is shown. Message 605 is a request by the application for the selector daemon to list all information cards. This request to list all information cards can include a security policy, as shown by security policy 610. Security policy 610 is optional within message 605, as the application may be requesting all information cards available on the computer, or the application may have previously registered a security policy (in which case to message 605 is a request to list all information cards that satisfy the previously registered security policy). Alternatively, the selector daemon can automatically associate security policy with the application the first time the security policy is received from the application in a request to list information cards that satisfy the security policy. In this manner, registration can be performed automatically.

It is worth noting that security policy 610 is not necessarily identical with security policy 150 shown in FIG. 1. Security policy 150 of FIG. 1 is a security policy received from a relying party. Security policy 610, on the other hand, can be a security policy for an application running on the local computer, independent of any relying party. Security policy 610 can also be a security policy received from a relying party, but it is not so limited.

Upon receiving message 605, the selector daemon identifies the target information cards, and transmits information about these information cards to the application. The information transmitted by the selector daemon to the application is usually information that is not secure: for example, an image of the information card, or a name for the information card.

FIG. 7 shows a message 705, which is a request to register security policy 610 with the selector daemon. Upon receiving message 705, the selector daemon identifies the application that sent message 705, and associates that application with security policy 610 in the list of associations stored within the selector daemon.

Figures 8, 9:
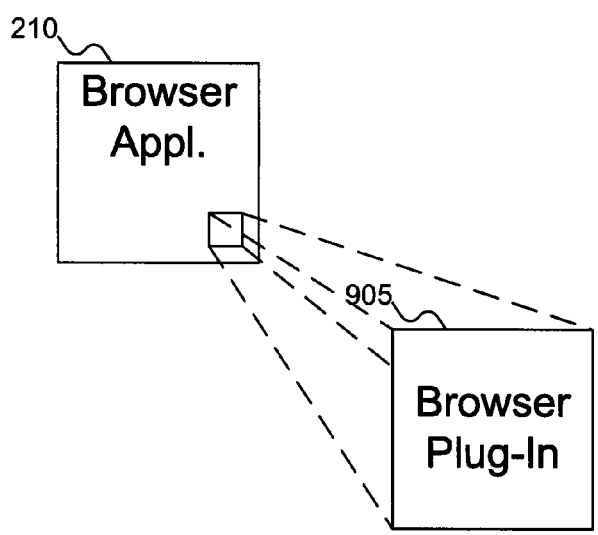
FIG. 8 shows more detail about the list of associations of FIG. 3.
FIG. 9 shows a browser acting as the application of FIG. 2.

FIG. 8 shows more detail about the list of associations of FIG. 3. In FIG. 3, this of associations 320 is shown. List of associations 320 shows three applications (805, 810, and 815), each associated with a single security policy (820, 825, and 830, respectively), but a person skilled in the art will recognize that there can be any number of applications with associated security policies.

When the selector daemon receives a request to identify information cards that does not include a security policy in the request, the selector daemon can access list of associations 320 and attempt to locate the application that issued the request. If the application that issued the request is found in list of associations 320, the selector daemon can access the associated security policy, and use that security policy to limit which information cards are returned to the application. For example, if application 810 issued a request to list information cards, based on list of associations 320, the selector daemon would know to use security policy 825 to limit the information cards returned to application 810.

FIG. 9 shows a browser acting as the application of FIG. 2. In FIG. 9, application 210 is shown to be a browser application. As discussed above with reference to FIG. 4, a browser application is a particular type of application that can request a list of information cards, and in one embodiment the security policy provided by the browser application to the selector daemon can itself have been received from a relying party. The browser application 210 can also have browser plug-in 905. Browser plug-in 905 can be implemented in any desired manner: for example, browser plug-in 905 can be implemented using Java™ technology or as an ActiveX® control. (Java is a trademark or a registered trademark of Sun Microsystems, Inc. in the United States and other countries. ActiveX is a registered trademark of Microsoft Corporation in the United States, and possibly other countries.) Browser plug-in 905 can provide additional functionality to browser application 210: for example, browser plug-in 905 might enable a user to gain access to information stored in the local intranet. If the local intranet requires a user to be authenticated before the user gains access to the resources of the local intranet, browser plug-in 905 can require a security token to authenticate the user. (This is also an example of a situation in which a browser application might have its own security policy independent of any relying party.) The selector daemon can receive messages from browser plug-in 905 as though it were a standalone application.

Figure 10:
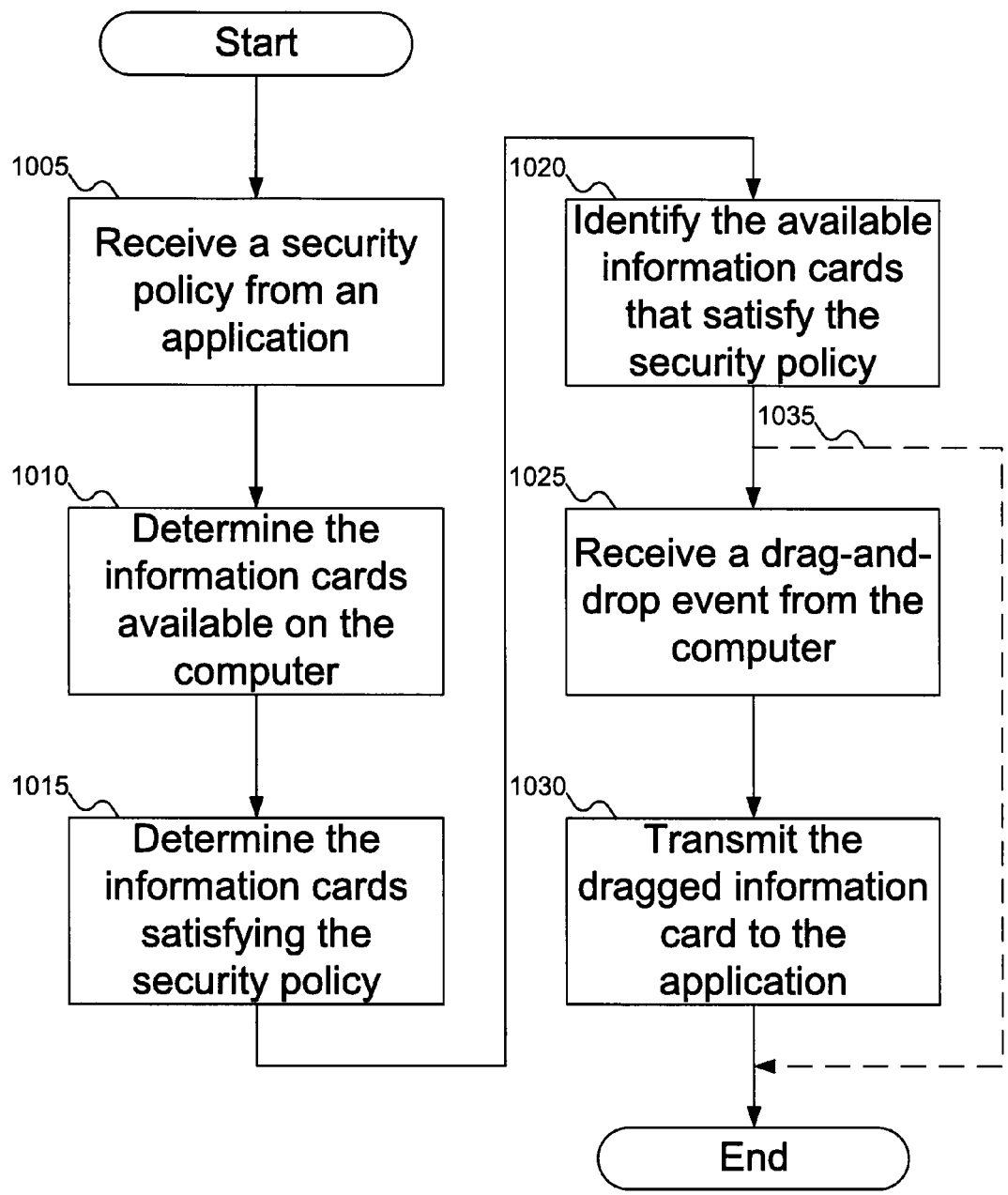
FIG. 10 shows a flowchart of a procedure for the selector daemon of FIG. 2 to interact with the application of FIG. 2.

FIG. 10 shows a flowchart of a procedure for the selector daemon of FIG. 2 to interact with the application of FIG. 2. In FIG. 10, at block 1005, the selector daemon receives a security policy from an application. As discussed above with reference to FIGS. 5-7, the selector daemon can receive the security policy either in a message to register the security policy with the selector daemon, or the selector daemon can receive the security policy from the application in a message requesting the security policy to list information cards to satisfy the security policy. At block 1010, the selector daemon determines which information cards are available on the computer. At block 1015, the selector daemon filters these information cards to identify the information cards available on the computer that satisfy the security policy.

At block 1020, the selector daemon identifies the available information cards that satisfy the security policy to some party that can use that information. As discussed above with reference to FIG. 3, the selector daemon can identify the available information cards that satisfy the security policy to the application (for example, in response to a request to list the information cards that satisfy the security policy). Alternatively, the selector daemon can identify the available information cards that satisfy the security policy to the user (for example, to enable the user to drag-and-drop an information card onto the application).

Figure 11:
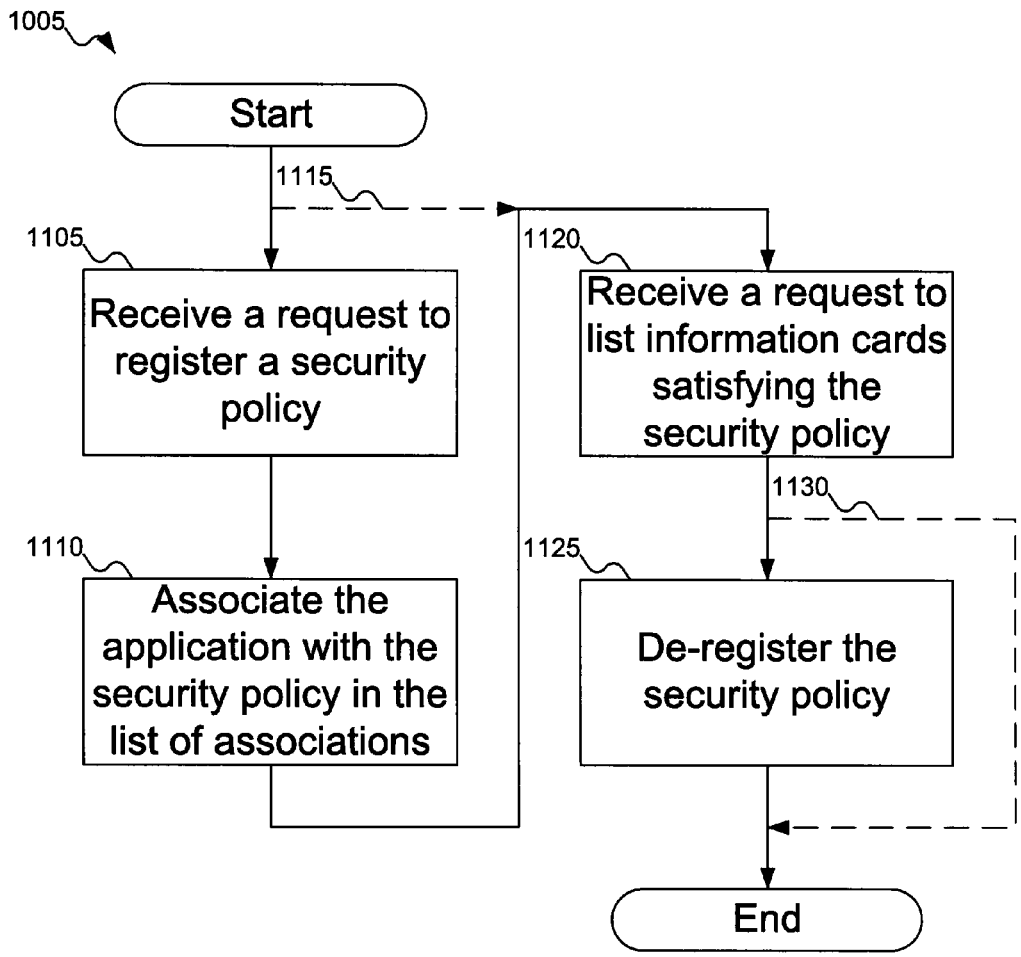
FIG. 11 shows a flowchart of a procedure for the selector daemon of FIG. 2 to manage security policies registered by applications.

FIG. 11 shows a flowchart of a procedure for the selector daemon of FIG. 2 to manage security policies registered by applications. In FIG. 11, at block 1105, the selector daemon receives a request to register a security policy from an application. At block 1110, the selector daemon associates the application with the security policy in the list of associations. Blocks 1105 and 1110 are optional, and can be skipped as shown by dashed line 1115.

At block 1120, the selector daemon receives a request to list information cards that satisfy the security policy. Assuming blocks 1105 and 1110 were performed, the request to list the information cards that satisfy the security policy received in block 1120 does not need to actually include the security policy itself. Finally, at block 1125, the selector daemon can de-register the security policy. Block 1125 can be performed at any time after block 1020 of FIG. 10; it is not required that block 1125 be performed immediately after block 1120. Deregistration can occur if the application expressly requests the security policy to be de-registered (either by associating a new security policy with the application or just by requesting that the association be removed from the list of associations). Deregistration can also occur if the selector daemon detects that the application is no longer resident in memory and is no longer running: if the application is no longer running, and there is no need to keep the associated security policy in the list of associations. Block 1125 is also optional and can be omitted, as shown by dashed line 1130.

Figure 12:
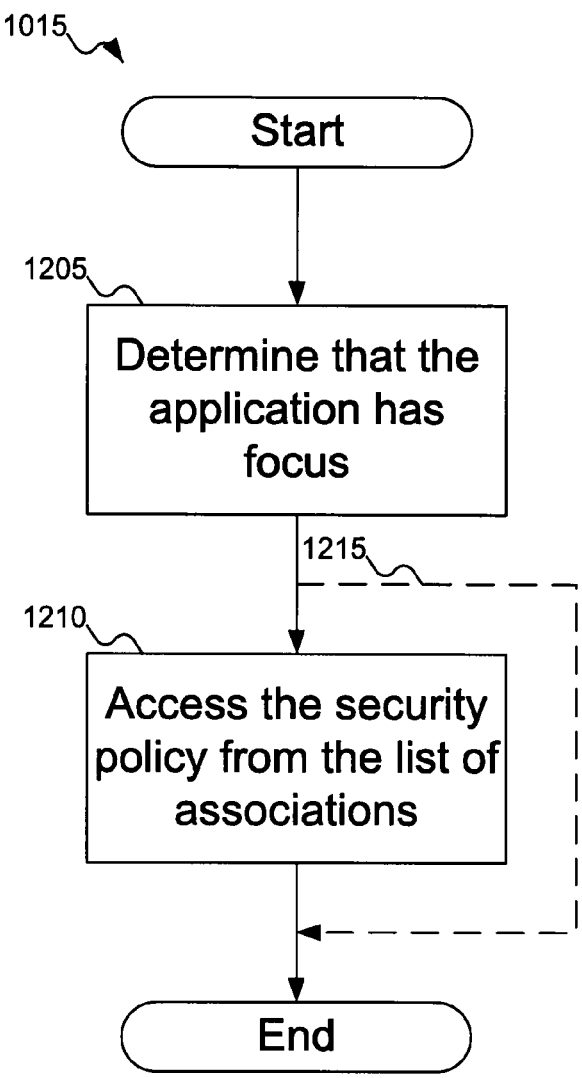
FIG. 12 shows a flowchart of a procedure for the selector daemon of FIG. 2 to identify a security policy to use.

FIG. 12 shows a flowchart of a procedure for the selector daemon of FIG. 2 to identify a security policy to use. In FIG. 12, at block 1205, the selector daemon determines that the application currently has focus. At block 1210, the selector daemon accesses the security policy associated with the application from the list of associations. A person skilled in the art will recognize that block 1210 cannot be performed if the security policy is not associated with the application in the list of associations. In addition, block 1210 does not need to be performed if the application provides a security policy in the message requesting the selector daemon to list information cards that satisfy the security policy (for example, if the application is overriding the security policy associated with the application and list of associations). As such, block 1210 can be omitted, as shown by dashed line 1215.

Figure 13:
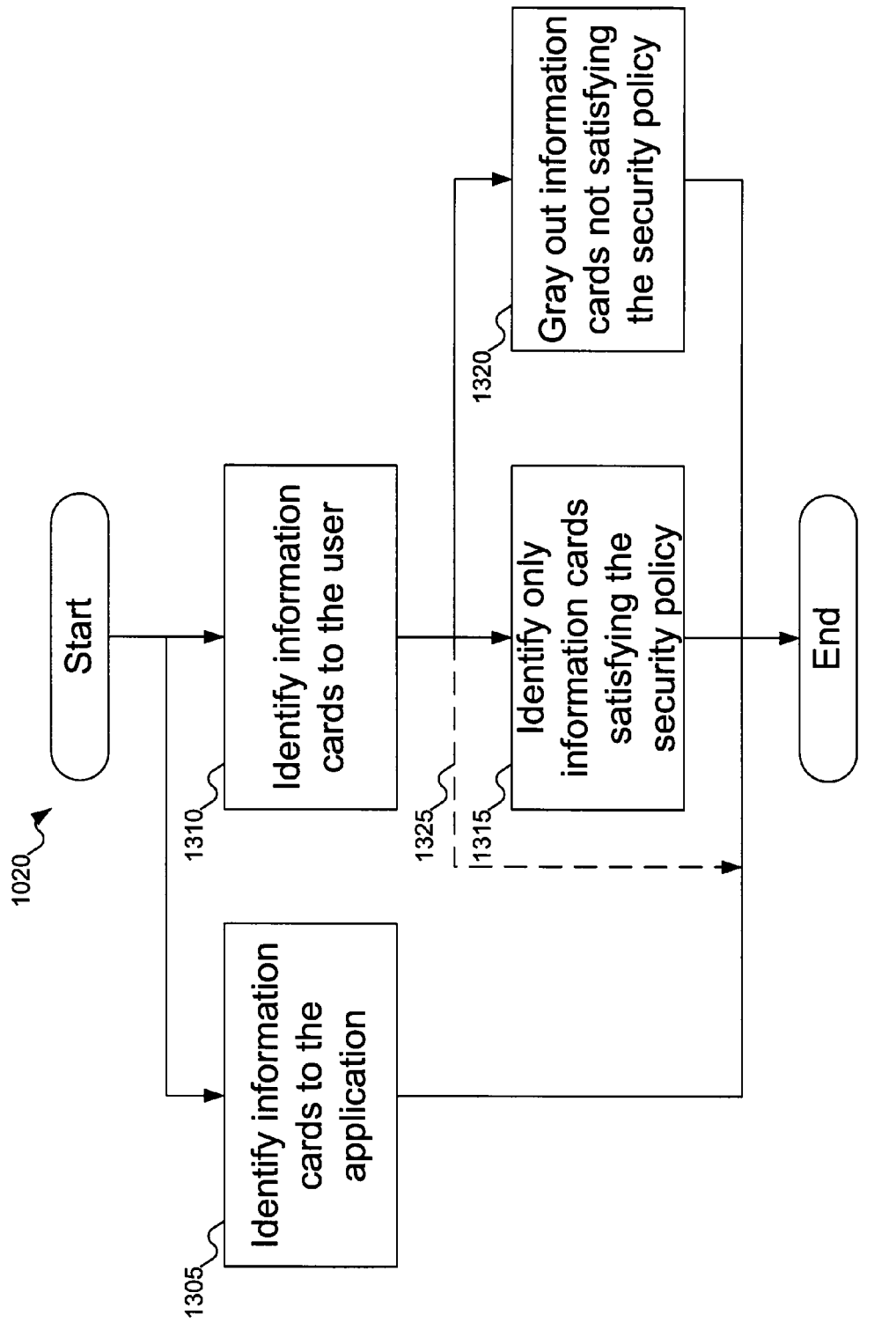
FIG. 13 shows a flowchart of a procedure for the selector daemon of FIG. 2 to identify information cards that satisfy the security policy.

FIG. 13 shows a flowchart of a procedure for the selector daemon of FIG. 2 to identify information cards that satisfy the security policy. In FIG. 13, at block 1305, the selector daemon can identify the information cards to the application (for example, the application that requested the selector daemon to list the information cards). Alternatively, at block 1310, the selector daemon can identify the information cards to the user. If the selector daemon identifies the information cards to the user, then block 1315, the selector daemon can identify to the user only those information cards that satisfy the security policy; information cards that do not satisfy the security policy are not identified to the user. Alternatively, at block 1320, the selector daemon can identify all information cards to the user, but gray out the information cards that do not satisfy the security policy. Blocks 1315 and 1320 are optional and can be omitted, as shown by dashed line 1325.

Figure 14:
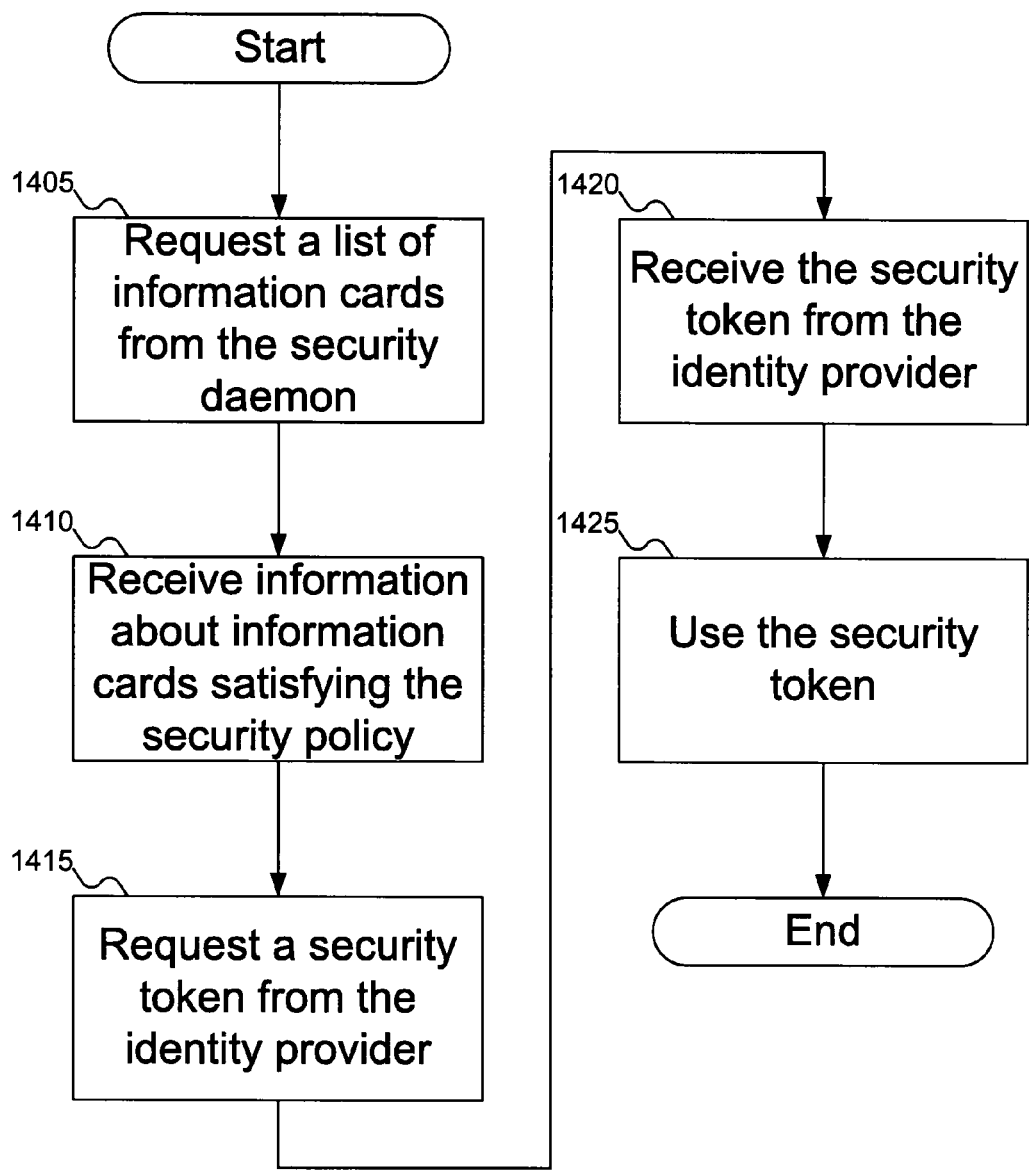
FIG. 14 shows a flowchart of a procedure for the application of FIG. 2 requesting information cards from the selector daemon of FIG. 2.

FIG. 14 shows a flowchart of a procedure for the application of FIG. 2 requesting information cards from the selector daemon of FIG. 2. In FIG. 14, at block 1405, the application requests a list of information cards from the security daemon. As discussed above with reference to FIGS. 5-7, the request to list information cards from the security daemon can include the security policy to be applied, or the selector daemon can access a previously-registered security policy. At block 1410, the application receives from the selector daemon information about the information cards that satisfy the security policy. This information can include non-secure information, such as images of the information cards.

At block 1415, the application requests a security token from an identity provider that manages the information card. At block 1420, the application receives from the identity provider the security token. As discussed above, in some embodiments the application can be an alternative card selector, replacing the standard card selector provided. In that case, it might be possible for the application to handle blocks 1415 and 1420 internally. In addition, if the application is capable of generating a security token based on the personal information card, blocks 1415 and 1420 can also be performed internally to the application. Finally, at block 1425, the application uses the security token. As discussed above, the "use" of the security token can be internal to the application, or it can involve providing the security token to another party, such as a relying party.

Figure 15:
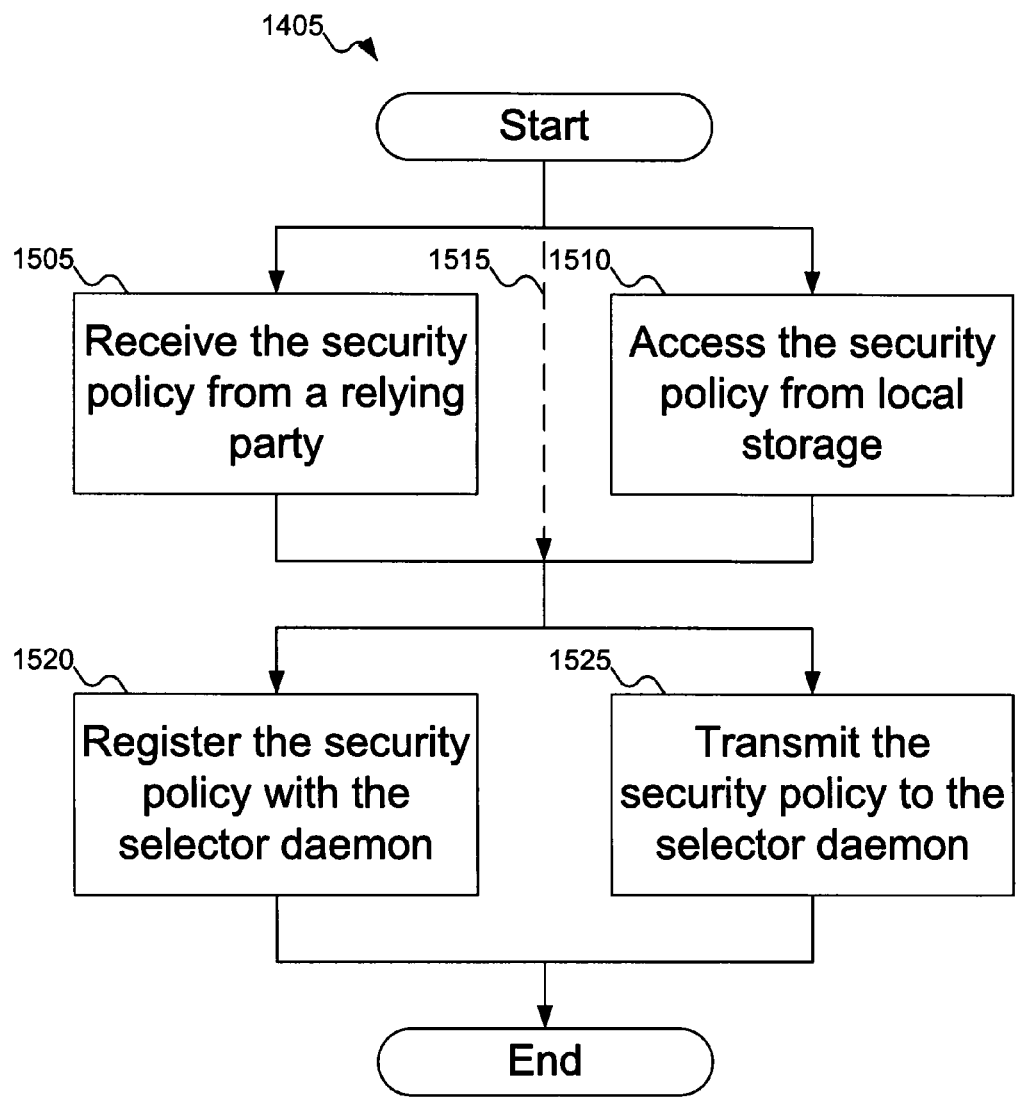
FIG. 15 shows a flowchart of a procedure for the application of FIG. 2 to provide the security policy to the selector daemon of FIG. 2.

FIG. 15 shows a flowchart of a procedure for the application of FIG. 2 to provide the security policy to the selector daemon of FIG. 2. In FIG. 15, at block 1505, the application receives a security policy from a relying party (or some other third party). This can occur, for example, if the application is a browser and the user is attempting to access a resource of the relying party. Alternatively, block 1510, the application can access the security policy from local storage. This can include a security policy stored on a hard disk of the computer or internally to the data of the application. It might also be possible for the application to access the security policy from some other source (for example, over a network), in which case blocks 1505 and 1510 can be omitted, as shown by dashed line 1515.

Regardless of how the application determines the security policy, at block 1520 the application can register the security policy with the selector daemon. As discussed above with reference to FIGS. 5-7, registering the security policy with the selector daemon makes it possible for the application to avoid having to provide the security policy to the selector daemon whenever a list of information cards is requested. Having applications register security policies with the selector daemon also gives the selector daemon some control over what information cards are automatically presented to the user based on the application that currently has the focus. For example, the selector daemon can present to the application information cards on the desktop that are not controlled by any particular application, but are available to all applications for use. Alternatively, at block 1525, the application can transmit the security policy to the selector daemon: for example, in a message requesting the selector daemon to list the available information cards that satisfy the security policy.

Figure 16:
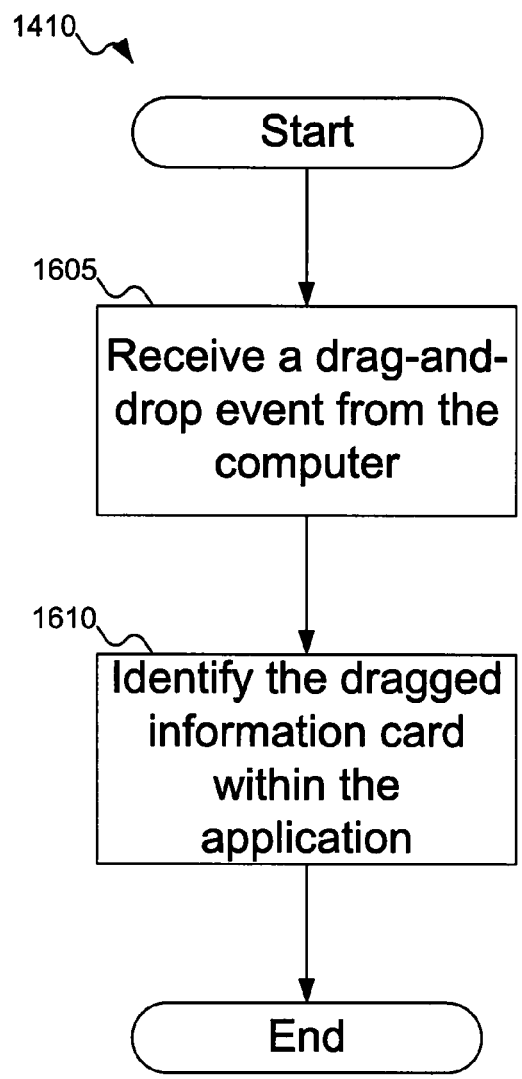
FIG. 16 shows a flowchart of a procedure for the application of FIG. 2 to receive an information card via a drag-and-drop event.

FIG. 16 shows a flowchart of a procedure for the application of FIG. 2 to receive an information card via a drag-and-drop event. FIG. 16 describes one way in which an application can receive an identifier of an information card for use in generating a security token; for example, as discussed above, the application could receive an identifier of an information card in a message from the selector daemon. At block 1605, the application receives a drag-and-drop event from the computer. This can occur, for example, if the operating system detects that the user has clicked on an information card with the mouse and is dragging the information card to the application. At block 1610, the application identifies the information card that was dragged by the user. The application can then use this identified information card in generating a security token, as discussed above.

Figure 17:
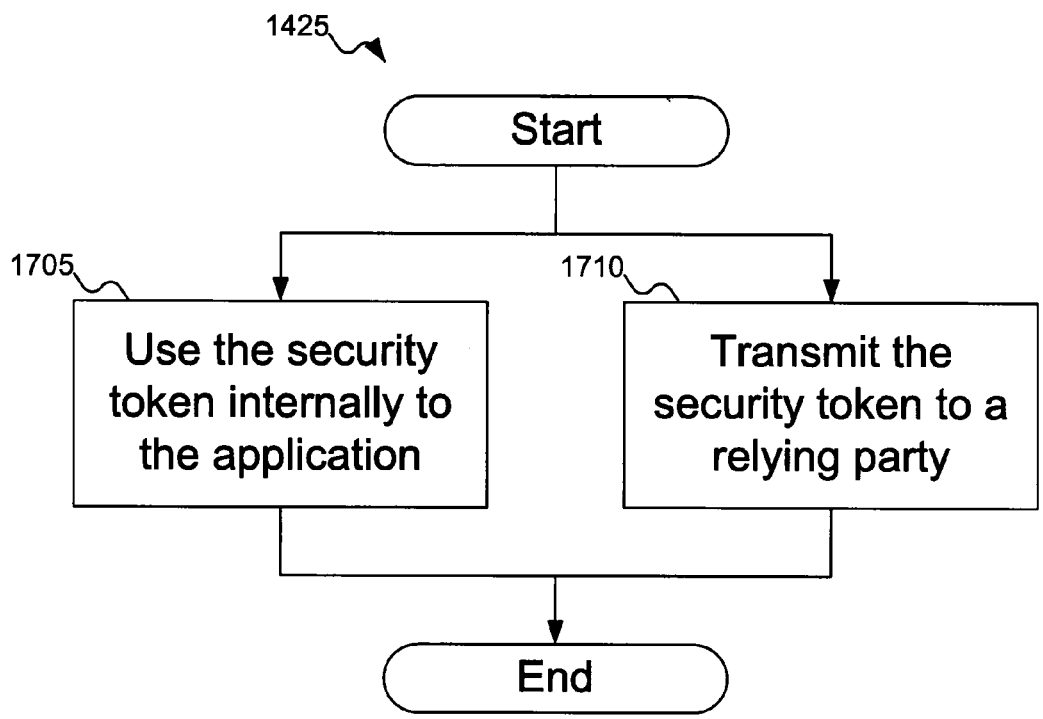
FIG. 17 shows a flowchart of a procedure for the application of FIG. 2 to use a security token.

FIG. 17 shows a flowchart of a procedure for the application of FIG. 2 to use a security token. In FIG. 17, at block 1705, the application can use the security policy internally: for example, to satisfy a request that the user authenticate himself. Alternatively, at block 1710, the application can transmit the security token to a third party that has requested the security token from the application: for example, a relying party whose resources the user is accessing via a browser application.

Figure 18:
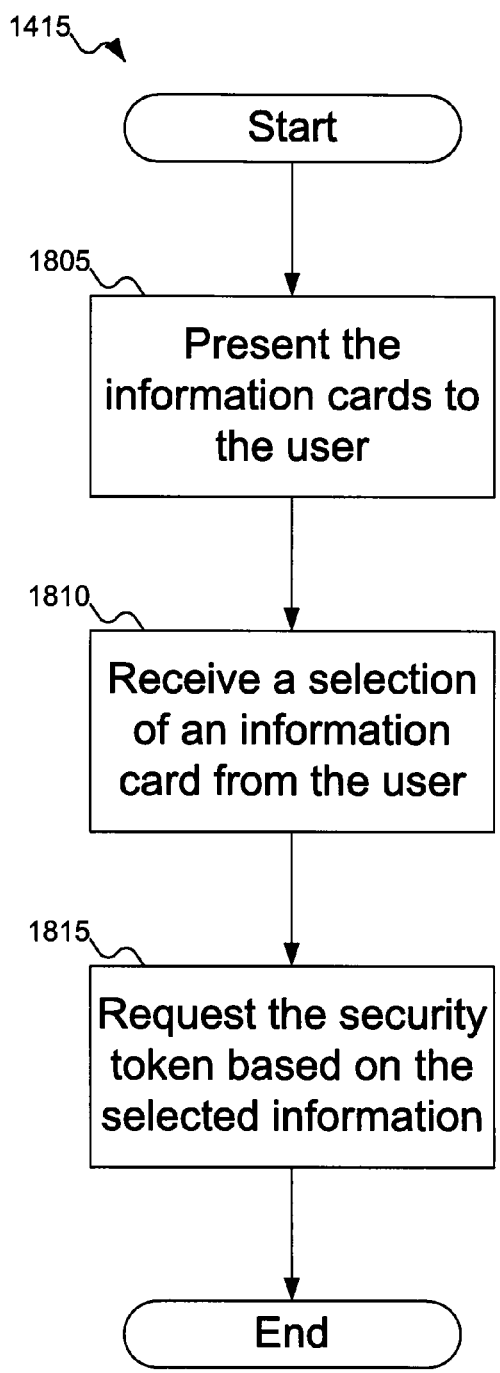
FIG. 18 shows a flowchart of a procedure for a user to select an information card to use with the application of FIG. 2.
Figure 19:
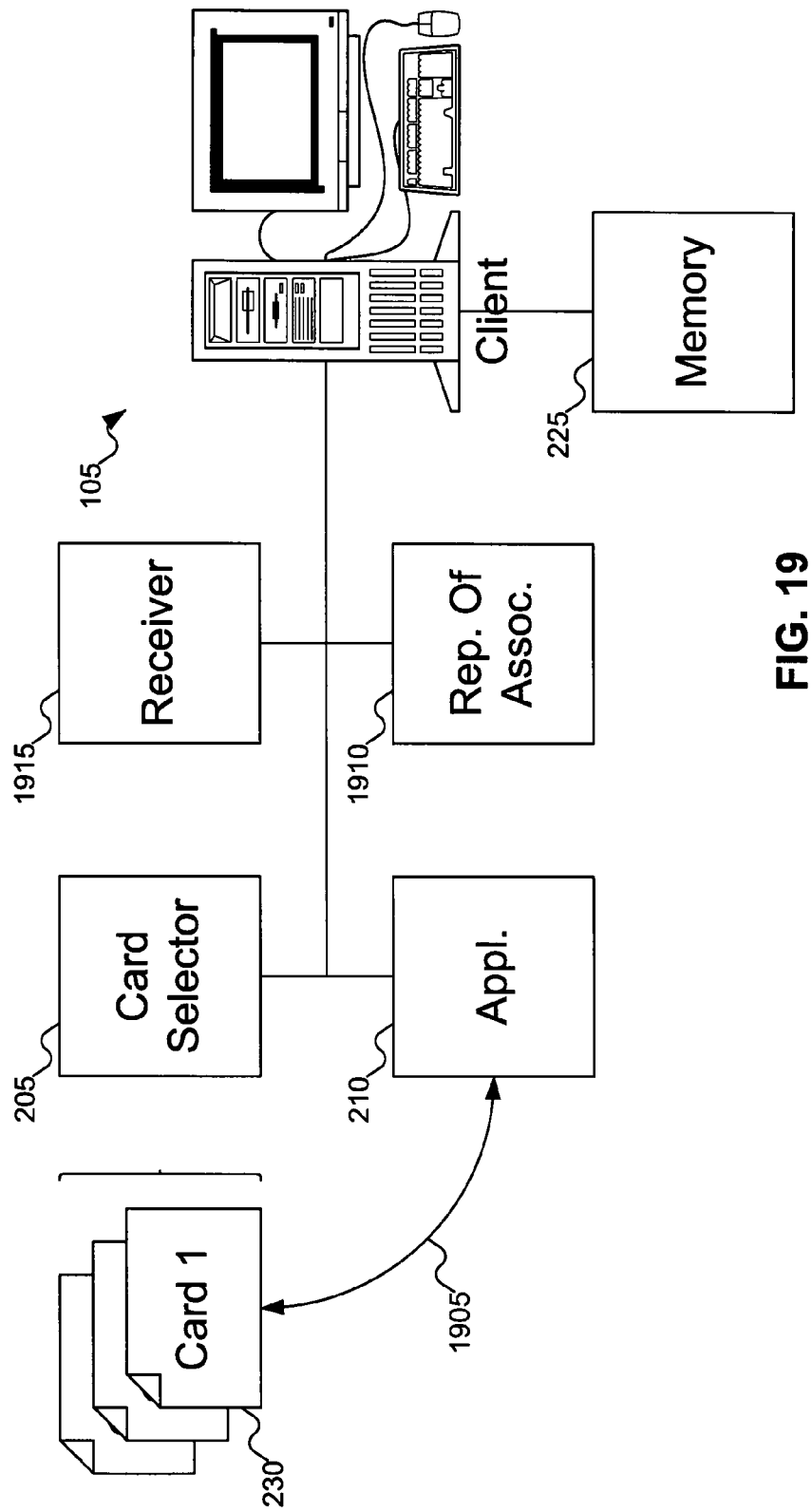
FIG. 19 shows the client of FIG. 1 with an association between an application and an information card, according to an embodiment of the invention.

FIG. 18 shows a flowchart of a procedure for a user to select an information card to use with the application of FIG. 2. In FIG. 18, at block 1805, the application presents to the user the information cards that are available on the computer and that satisfy the security policy. At block 1810, the application receives from the user at the selection of an information card. At block 1815, the application requests a security token from the identity provider managing the selected information card. This request for the security token can be via the selector daemon or the card selector, or the application can request the security token directly from the identity provider, if the application is capable of generating such a request FIG. 19 shows the client of FIG. 1 with an association between an application and an information card, according to an embodiment of the invention. In FIG. 19, client 105 includes card selector 205, information card 230, application 210, and memory 225. These elements of FIG. 19 are similar to those shown in the FIG. 2, and are not discussed again here.

In addition, client 105 includes association 1905 between application 210 and information card 230. Association 1905 can be represented as representation 1910 of association. This representation 1910 can be, for example, a shortcut to application 210 that causes information card 230 to be provided to application 210. Association 1905, and its representation 1910, provide a way to speed up the invocation and execution of application 210: rather then starting application 210 and then having to use a selector daemon or a card selector to select an information card to be passed to application 210, Association 1905 and representation 1910 provide a way to automate this process.

While FIG. 19 shows association 1905 between application 210 and information card 230, a person skilled in the art will recognize that application 210 is not limited to a standalone application. That is, application 210 can be, for example, a browser application designed to visit a particular website. In browser application parlance, a shortcut to a website is usually termed a bookmark, and is usually stored internally to the browser application. In this situation, representation 1910 can reside on the desktop of client 105 (automating all of the steps of opening the browser application, visiting the target website, and providing to the browser application and information card to be used to generate a security token for use with the target website). Alternatively, representation 1910 can reside as a bookmark within the browser application.

Figure 20:
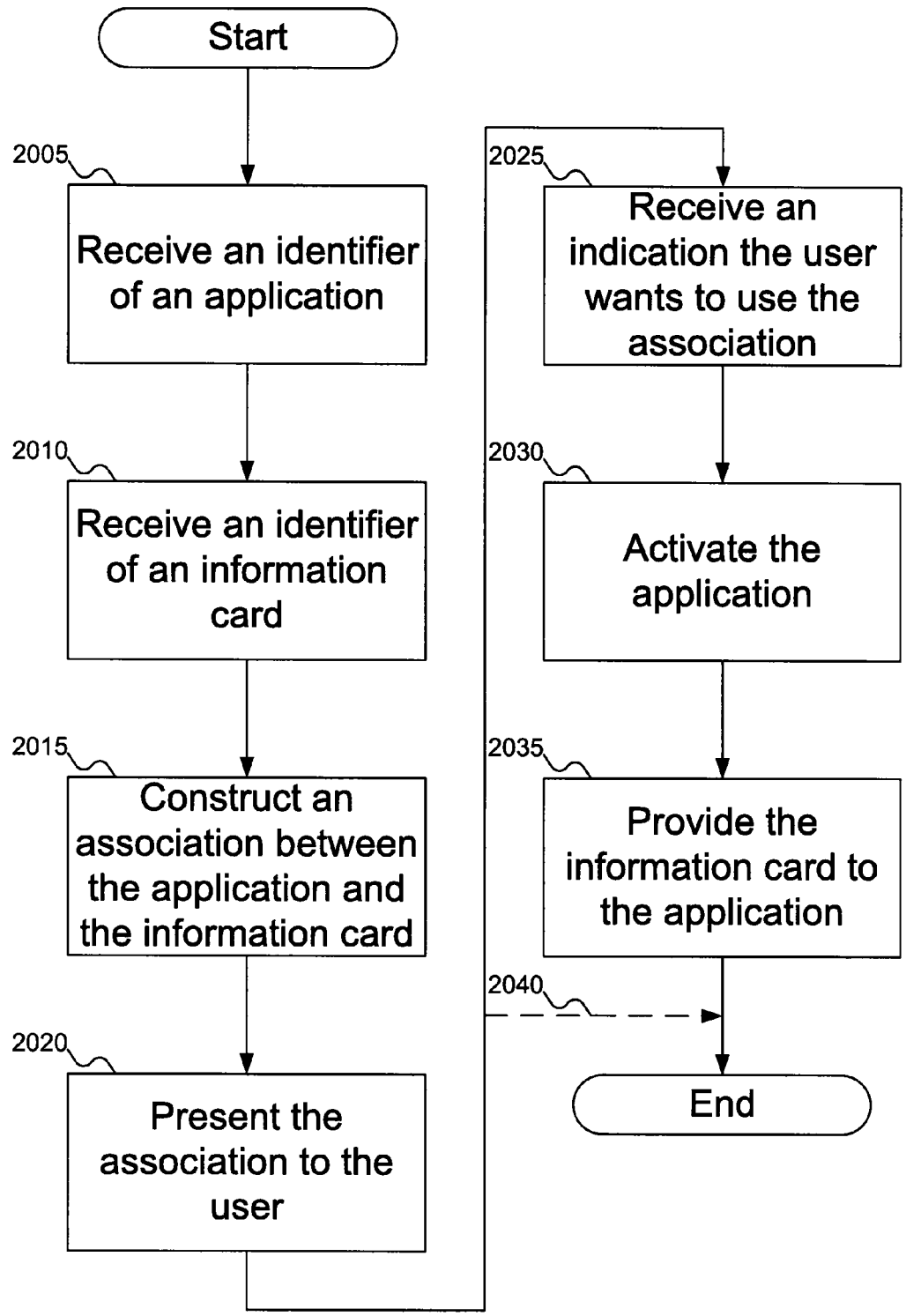
FIG. 20 shows a flowchart of a procedure to create and use an association between the application of FIG. 19 and the information card of FIG. 19.

FIG. 20 shows a flowchart of a procedure to create and use an association between the application of FIG. 19 and the information card of FIG. 19. In FIG. 20, at block 2005, the system receives an identifier of an application. At block 2010 system receives an identifier of an information card. At block 2015, the system constructs an association between the identified application and the identified information card. At block 2020, the system presents to the user the association (for example, by displaying a representation of the association).

At block 2025, the system receives an indication that the user wants to use the association. At block 2030, the system activates the application. At block 2035, the system provides the information card to the application. As discussed above, the information card as presented to the application can be non-secure information about the information card: for example, an image of the information card. Blocks 2025, 2030, and 2035 are optional and can be omitted, as shown by dashed line 2040.

The following discussion is intended to provide a brief, general description of a suitable machine in which certain aspects of the invention can be implemented. Typically, the machine includes a system bus to which is attached processors, memory, e.g., random access memory (RAM), read-only memory (ROM), or other state preserving medium, storage devices, a video interface, and input/output interface ports. The machine can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine can include embedded controllers, such as programmable or non-programmable logic devices or arrays, Application Specific Integrated Circuits, embedded computers, smart cards, and the like. The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention can be described by reference to or in conjunction with associated data including functions, procedures, data structures, application programs, instructions, etc. which, when accessed by a machine, result in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, and other tangible, physical storage media. Associated data can also be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as can come within the scope and spirit of the following claims and equivalents thereto.

The invention claimed is:

1. A system, comprising:
   a computer;
   a memory in the computer;
   an application stored in the memory; and
   a selector daemon stored in the memory, the selector daemon including:
      a receiver to receive a message from the application for a security policy of the application;
      a list of associations between security policies and applications; and
      an information card identifier to identify at least one information card on the computer that satisfies said security policy,
   wherein the selector daemon locates the application from the list of associations for the message to access the security policy associated with the application in the list of associations,
   wherein the memory also includes a card selector, said card selector operative to receive said security policy from the application and transmit a security token to the application, the card selector using a user interface separate from the application.

2. A system according to claim 1, wherein the receiver is operative to receive a said
   security policy from the application in a message requesting said at least one information card on the computer that satisfies said security policy.

3. A system according to claim 1, wherein the receiver is operative to receive a request from the application to register said security policy with the selector daemon.

4. A system according to claim 3, wherein the selector daemon automatically register the security policy to be associated with the application in the list of associations at a first time the security policy is received from the application.

5. A system according to claim 1, wherein the selector daemon includes a focus detector to determine that the application currently has focus.

6. A system according to claim 5, wherein the selector daemon is operative to access the list of associations when the application has the focus.

7. A system according to claim 1, wherein the selector daemon includes a transmitter to transmit to the application said at least one information card satisfying said security policy.

8. A system according to claim 1, wherein the selector daemon includes an information card presenter to present to a user said at least one information card satisfying said security policy.

9. A system according to claim 8, wherein the information card presenter is operative to permit the user to drag an information card that satisfies said security policy onto the application.

10. A system according to claim 1, wherein the application includes a user interface to enable a user to select one of said at least one information card satisfying said security policy for use with the application.

11. A method for operating a selector daemon as a background application on a computer, the selector daemon having a list of associations between security policies and applications, the selector daemon distinguishable from a card selector operative to receive a security policy from an application and transmit a security token to the application, the card selector using a user interface separate from the application, comprising:
   at the selector daemon, receiving a message from an application for the security policy of the application;
   at the selector daemon, accessing the security policy associated with the application from the list of associations, wherein the application is located from the list of associations for the accessing of the security policy;
   at the selector daemon, determining at least one information card available on the computer;
   at the selector daemon, determining at least one information card satisfying the security policy from the at least one information card available on the computer; and
   at the selector daemon, identifying the at least one information card satisfying the security policy.

12. A method according to claim 11, wherein the message is received from the application to list the information cards satisfying the security policy.

13. A method according to claim 11, wherein receiving a security policy from an application includes receiving a request from the application to register the security policy with the selector daemon.

14. A method according to claim 13, wherein receiving a request from
   the application to register the security policy with the selector daemon includes associating the security policy with the application, so that the selector daemon can process a request from the application that does not include the security policy.

15. A method according to claim 13, further comprising deregistering the security policy when the application leaves memory.

16. A method according to claim 11, wherein determining at least one information card satisfying the security policy includes determining that the application currently has focus.

17. A method according to claim 16, wherein determining at least one information card satisfying the security policy further includes accessing a security policy associated with the application.

18. A method according to claim 17, wherein the security policy associated with the application was previously registered by the application.

19. A method according to claim 11, wherein identifying the at least one information card satisfying the security policy includes identifying to the application the at least one information card satisfying the security policy.

20. A method according to claim 11, further comprising:
   receiving an event of an information card being dragged onto the application; and
   identifying at the application information about the information card dragged onto the application.

21. An article, comprising a non-transitory storage medium, said non-transitory storage medium having stored thereon instructions that, when executed by a machine, result in a selector daemon:
   receiving a message from an application for a security policy of the application;
   accessing the security policy associated with the application from a list of associations for the message, wherein the application is located from the list of associations for the accessing of the security policy;
   determining at least one information card available on the computer;
   determining at least one information card satisfying the security policy from the at least one information card available on the computer; and
   identifying the at least one information card satisfying the security policy,
   wherein the selector daemon is distinguishable from a card selector operative to receive the security policy from the application and transmit a security token to the application, the card selector using a user interface separate from the application.

22. An article according to claim 21, wherein the message is received from the application to list the information cards satisfying the security policy.

23. An article according to claim 21, wherein receiving a security policy from an application includes receiving a request from the application to register the security policy with the selector daemon.

24. An article according to claim 23, wherein receiving a request from the application to register the security policy with the selector daemon includes associating the security policy with the application, so that the selector daemon can process a request from the application that does not include the security policy.

25. An article according to claim 23, said non-transitory storage medium has stored thereon further instructions that, when executed by the machine, result in deregistering the security policy when the application leaves memory.

26. An article according to claim 21, wherein determining at least one information card satisfying the security policy includes determining that the application currently has focus.

27. An article according to claim 26, wherein determining at least one information card satisfying the security policy further includes accessing a security policy associated with the application.

28. An article according to claim 27, wherein the security policy associated with the application was previously registered by the application.

29. An article according to claim 21, wherein identifying the at least one information card satisfying the security policy includes
   identifying to the application the at least one information card satisfying the security policy.

30. An article according to claim 21, said non-transitory storage medium has stored thereon further instructions that, when executed by the machine, result in:
   receiving an event of an information card being dragged onto the application; and identifying at the application information about the information card dragged onto the application.

31. A method for an application to interface with a selector daemon, comprising:
   requesting from the selector daemon on a computer a list of information cards that satisfy a security policy;
   receiving from the selector daemon at least one information card that satisfies the security policy;
   requesting a security token from an identity provider using the at least one information card that satisfies the security policy;
   receiving the security token from the identity provider; and using the security token,
   wherein the selector daemon is distinguishable from a card selector operative to receive the security policy from the application and transmit the security token to the application, the card selector using a user interface separate from the application.

32. A method according to claim 31, wherein requesting from the selector daemon a list of information cards that satisfy a security policy includes transmitting to the selector daemon the security policy.

33. A method according to claim 32, wherein transmitting to the selector daemon the security policy includes registering the security policy with the selector daemon when the application is loaded into memory.

34. An article, comprising a storage medium, said storage medium having stored thereon instructions that, when executed by a machine, result in an application:
   requesting from the selector daemon a list of information cards that satisfy a security policy; receiving from the selector daemon at least one information card that satisfies the security policy;
   requesting a security token from an identity provider using the at least one information card that satisfies the security policy;
   receiving the security token from the identity provider; and using the security token
   wherein the selector daemon is distinguishable from a card selector operative to receive the security policy from the application and transmit the security token to the application, the card selector using a user interface separate from the application.

35. An article according to claim 34, wherein requesting from the selector daemon a list of information cards that satisfy a security policy includes transmitting to the selector daemon the security policy.

36. An article according to claim 35, wherein transmitting to the selector daemon the security policy includes registering the security policy with the selector daemon when the application is loaded into memory.

37. A system, comprising:
   a computer;
   a memory in the computer;
   an application stored in the memory;
   an information card stored in the memory;
   an association between the application and the information card; and
   a selector daemon operative to receive a message from the application, to locate the application from a list of associations to access a security policy associated with the application in the list of associations for the message, and to identify the information card that satisfies the security policy for the application,
   wherein the memory also includes a card selector, said card selector operative to receive said security policy from the application and transmit a security token to the application, the card selector using a user interface separate from the application,
   wherein the information card can be used with the application to satisfy the security policy associated with the application without invoking the card selector to select the information card.

38. A system according to claim 37, further comprising a representation of the association between the application and the information card that can be presented to the user.

39. A system according to claim 37, wherein: the system further comprises a receiver to receive from said user an indication that said user wants to activate the association between the application and the information card; and the computer is capable of executing the application and providing an identifier of the information card to the application.

40. A method, comprising:
   operating a selector daemon, wherein the selector daemon is distinguishable from a card selector operative to receive a security policy from an application and transmit a security token to the application, the card selector using a user interface separate from the application, wherein the operating comprises:
     receiving a message from the application for a security policy of the application,
     accessing the security policy associated with the application from a list of associations, wherein the application is located from the list of associations for the accessing of the security policy,
     determining at least one information card available on the computer,
     determining at least one information card satisfying the security, policy from the at least one information card available on the computer, and
     identifying the at least one information card satisfying the security policy;
   receiving an identifier of the application on the computer;
   receiving an identifier of an information card; and
   constructing an association between the application and the information card,
   so that the information card can be used with the application to satisfy the security policy associated with the application without invoking the card selector to select the information card.

41. A method according to claim 40, further comprising presenting a user with the association between the application and the information card.

42. A method according to claim 41, further comprising:
   receiving an indication that the user wants to activate the association between the application and the information card;
   activating the application; and
   providing the identifier of the information card to the application.

43. An article, comprising a non-transitory storage medium, said non-transitory storage medium having stored thereon instructions that, when executed by a machine, result in:
   operating a selector daemon, wherein the selector daemon is distinguishable from a card selector operative to receive a security policy from an application and transmit a security token to the application, the card selector using a user interface separate from the application, wherein the operating comprises:
     receiving a message from the application for a security policy of the application, accessing the security policy associated with the application from a list of associations, wherein the application is located from the list of associations for the accessing of the security policy, determining at least one information card available on the computer, determining at least one information card satisfying the security, policy from the at least one information card available on the computer, and identifying the at least one information card satisfying the security policy;

receiving an identifier of the application;

receiving an identifier of the information card; and constructing an association between the application and the information card so that information card can be used with the application to satisfy the security policy associated with the application without invoking the card selector to select the information card.

44. An article according to claim 43, said non-transitory storage medium has stored thereon further instructions that, when executed by the machine, result in presenting a user with the association between the application and the information card.

45. An article according to claim 44, said non-transitory storage medium has stored thereon further instructions that, when executed by the machine, result in:

receiving an indication that the user wants to activate the association between the application and the information card;

activating the application; and providing the identifier of the information card to the application.

* * * * *